United States Patent
Miller et al.

(10) Patent No.: US 12,552,289 B2
(45) Date of Patent: Feb. 17, 2026

(54) SYSTEMS AND METHODS FOR PRE-CONDITIONING A VEHICLE

(71) Applicant: Oshkosh Corporation, Oshkosh, WI (US)

(72) Inventors: Amanda Miller, Oshkosh, WI (US); Mike J. Bolton, Oshkosh, WI (US); Jeff Verhagen, Oshkosh, WI (US); Chris Goodman, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 288 days.

(21) Appl. No.: 18/110,948

(22) Filed: Feb. 17, 2023

(65) Prior Publication Data
US 2023/0264601 A1 Aug. 24, 2023

Related U.S. Application Data

(60) Provisional application No. 63/311,586, filed on Feb. 18, 2022.

(51) Int. Cl.
*B60L 58/24* (2019.01)
*B60H 1/00* (2006.01)
(Continued)

(52) U.S. Cl.
CPC .......... *B60L 58/24* (2019.02); *B60H 1/00878* (2013.01); *B60L 53/60* (2019.02);
(Continued)

(58) Field of Classification Search
CPC .......... B60R 16/0231; B65F 3/02; B65F 3/00; G06Q 10/06311; B60H 1/00378;
(Continued)

(56) References Cited

U.S. PATENT DOCUMENTS 7,439,711 B2 10/2008 Bolton
11,097,617 B2 8/2021 Rocholl et al.
(Continued)

FOREIGN PATENT DOCUMENTS

DE 102018110396 A1 * 11/2018 ............. B60H 1/004
DE 102018111259 A1 * 11/2018 ......... B60H 1/00385
JP 2013147881 A * 8/2013

OTHER PUBLICATIONS

"Improved Performance of Li-ion Polymer Batteries Through Improved Pulse Charging Algorithm" by J. M. Amanor-Boadu and A. Guiseppi-Elie Appl. Sci 2020 10, 895 (Year: 2020).*
(Continued)

*Primary Examiner* — Kito R Robinson
*Assistant Examiner* — Tanya C Sienko
(74) *Attorney, Agent, or Firm* — Foley & Lardner LLP

(57) ABSTRACT

A control system for pre-conditioning a refuse vehicle includes processing circuitry. The processing circuitry is configured to obtain a scheduled deployment time of the refuse vehicle. The processing circuitry is also configured to perform a first pre-conditioning operation by operating a charging system to charge batteries of the refuse vehicle at a first charge rate over a first time interval, and a second charge rate over a second time interval to fully charge the batteries by the scheduled deployment time. The charging system is configured to provide direct current (DC) electrical energy to the batteries for charging. The processing circuitry is also configured to perform multiple other pre-conditioning operations at least partially simultaneously with performing the first pre-conditioning operation.

20 Claims, 17 Drawing Sheets

(51) Int. Cl.
*B60L 53/60* (2019.01)
*B60R 16/023* (2006.01)
*B65F 3/02* (2006.01)
*G06Q 10/0631* (2023.01)

(52) U.S. Cl.
CPC ............ *B60R 16/0231* (2013.01); *B65F 3/02* (2013.01); *G06Q 10/06311* (2013.01); *B65F 2003/0279* (2013.01)

(58) Field of Classification Search
CPC .............. B60H 1/0073; B60H 1/00778; B60H 1/00878; B60L 1/003; B60L 1/02; B60L 58/26; B60L 58/27; B60L 58/24; B60L 53/60

See application file for complete search history.

(56) References Cited

U.S. PATENT DOCUMENTS

| | | | |
|---|---|---|---|
| 11,472,308 | B2 | 10/2022 | Messina et al. |
| 11,511,642 | B2 | 11/2022 | Messina et al. |
| 12,030,464 | B2 * | 7/2024 | Gutowski ................. A61L 9/18 |
| 2005/0113996 | A1 | 5/2005 | Pillar et al. |
| 2012/0234930 | A1 * | 9/2012 | Wijaya ..................... H04Q 9/00 236/51 |
| 2017/0225586 | A1 * | 8/2017 | Zhang ..................... B60L 58/18 |
| 2018/0141458 | A1 * | 5/2018 | Jammoul ............... H01M 10/63 |
| 2020/0346547 | A1 | 11/2020 | Rocholl et al. |
| 2021/0031649 | A1 | 2/2021 | Messina et al. |
| 2021/0143663 | A1 | 5/2021 | Bolton |
| 2021/0276450 | A1 | 9/2021 | Eshleman et al. |
| 2021/0339632 | A1 | 11/2021 | Rocholl et al. |
| 2022/0097527 | A1 | 3/2022 | Koga et al. |
| 2022/0097961 | A1 | 3/2022 | Koga et al. |
| 2022/0097964 | A1 | 3/2022 | Koga et al. |
| 2022/0118854 | A1 | 4/2022 | Davis et al. |
| 2022/0185582 | A1 | 6/2022 | Koga et al. |
| 2022/0305941 | A1 * | 9/2022 | Telpaz ................. H02J 7/0048 |
| 2023/0047110 | A1 | 2/2023 | Smith et al. |
| 2023/0047430 | A1 | 2/2023 | Smith et al. |
| 2023/0048292 | A1 | 2/2023 | Smith et al. |
| 2023/0048621 | A1 | 2/2023 | Smith et al. |
| 2023/0049763 | A1 | 2/2023 | Messina et al. |
| 2023/0052557 | A1 | 2/2023 | Smith et al. |
| 2023/0052626 | A1 | 2/2023 | Smith et al. |
| 2023/0052923 | A1 | 2/2023 | Smith et al. |
| 2023/0057525 | A1 | 2/2023 | Smith et al. |
| 2023/0137357 | A1 * | 5/2023 | Chopra ..................... B60L 3/12 320/109 |
| 2023/0256842 | A1 * | 8/2023 | Robinson ................ B60L 53/18 701/22 |

OTHER PUBLICATIONS

"Introduction to CAN (Controller Area Network)" by S. St. Michael, Feb. 19, 2019. Downloaded from https://www.allaboutcircuits.com/technical-articles/introduction-to-can-controller-area-network/ (Year: 2019).*
Machine translation of DE-102018110396 downloaded from Search Dec. 19, 2024 (Year: 2024).*
Machine translation of DE-102018111259 downloaded from SEarch Dec. 19, 2024 (Year: 2024).*
Machine translation of JP2013147881 downloaded from Espacenet Jun. 17, 2025 (Year: 2025).*
https://info.macktrucks.com/refuse-revolution; "Welcome to the refuse revolution. Mack LR Electric." Retrieved on Mar. 21, 2023.
https://www.youtube.com/watch?v=NQFtAnm7D-c; "All-New Mack LR Electric Garbage Truck." Retrieved on Mar. 21, 2023.

* cited by examiner

SYSTEMS AND METHODS FOR PRE-CONDITIONING A VEHICLE

CROSS-REFERENCE TO RELATED PATENT APPLICATION

This application claims the benefit of and priority to U.S. Provisional Application No. 63/311,586, filed Feb. 18, 2022, the entire disclosure of which is incorporated by reference herein.

BACKGROUND

The present disclosure relates generally to vehicles. More specifically, the present disclosure relates to a vehicle including a chassis. A chassis typically includes one or more frame components that support the other structures of the vehicle (e.g., a cab, a body, an implement, etc.). The chassis may include tractive elements coupled the frame that engage a support surface (e.g., the ground) to support the vehicle. The chassis may be coupled to components, such as a body or an implement, that are specific to a desired application of the vehicle.

SUMMARY

One implementation of the present disclosure is a control system for pre-conditioning a refuse vehicle, according to some embodiments. The control system includes processing circuitry configured to obtain a scheduled deployment time of the refuse vehicle, according to some embodiments. The processing circuitry is also configured to perform a first pre-conditioning operation over a first time interval and a second time interval to prepare the refuse vehicle by the scheduled deployment time. In some embodiments, performing the first pre-conditioning operation includes operating a charging system to charge batteries of the vehicle at a first charge rate over the first time interval, and a second charge rate over the second time interval to fully charge the batteries by the scheduled deployment time, according to some embodiments. In some embodiments, the charging system is configured to provide electrical energy to the batteries for charging. In some embodiments, the batteries are configured to provide electrical energy for driving tractive elements of the refuse vehicle. The processing circuitry is further configured to perform other pre-conditioning operations at least partially simultaneously with performing the first pre-conditioning operation over at least the second time interval to prepare the refuse vehicle by the scheduled deployment time, according to some embodiments.

In some embodiments, the first charge rate is less than the second charge rate and the first time interval is greater than the second time interval. In some embodiments, the other pre-conditioning operations include a second pre-conditioning operation including operating an HVAC system for a cab of the vehicle to drive a temperature of the cab to be within a high temperature threshold and a low temperature threshold by the scheduled deployment time.

In some embodiments, the other pre-conditioning operations include a third pre-conditioning operation including activating a defrost operation of the HVAC system for the cab of the vehicle to defrost a window of the vehicle by the scheduled deployment time. In some embodiments, the other pre-conditioning operations include a fourth pre-conditioning operation including operating a thermal management system of the refuse vehicle to maintain a temperature at the batteries within a high temperature threshold and a low temperature threshold across the first time interval and the second time interval.

In some embodiments, the other pre-conditioning operations include a fifth pre-conditioning operation including initiating a hydraulic heating action based on an environmental temperature during at least one of the first time interval or the second time interval so that a temperature at a hydraulic of the refuse vehicle is substantially equal to a desired temperature at the scheduled deployment time. In some embodiments, the other pre-conditioning operations include a sixth pre-conditioning operation including sending a request to each of multiple devices on a controller area network (CAN) bus, monitoring a reply from each of the devices on the CAN bus, and determining, based on the reply or a presence of the reply from each of the devices on the CAN bus, which of the devices are communicating properly, and which are not communicating properly.

Another implementation of the present disclosure is a method for pre-conditioning a refuse vehicle, according to some embodiments. In some embodiments, the method includes obtaining a scheduled deployment time of the refuse vehicle. In some embodiments, the method includes performing a first pre-conditioning operation over a first time interval and a second time interval to prepare the refuse vehicle by the scheduled deployment time. In some embodiments, performing the first pre-conditioning operation includes operating a charging system to charge batteries of the vehicle at a first charge rate over the first time interval, and a second charge rate over the second time interval to fully charge the batteries by the scheduled deployment time. In some embodiments, the charging system is configured to provide electrical energy to the batteries for charging. In some embodiments, the batteries are configured to provide electrical energy for driving tractive elements of the refuse vehicle. In some embodiments, the method includes performing other pre-conditioning operations at least partially simultaneously with performing the first pre-conditioning operation.

In some embodiments, the first charge rate is less than the second charge rate and the first time interval is greater than the second time interval. In some embodiments, the other pre-conditioning operations include a second pre-conditioning operation including operating an HVAC system for a cab of the vehicle to drive a temperature of the cab to be within a high temperature threshold and a low temperature threshold by the scheduled deployment time.

In some embodiments, the other pre-conditioning operations include a third pre-conditioning operation including activating a defrost operation of the HVAC system for the cab of the vehicle to defrost a window of the vehicle by the scheduled deployment time. In some embodiments, the other pre-conditioning operations include a fourth pre-conditioning operation including operating a thermal management system of the refuse vehicle to maintain a temperature at the batteries within a high temperature threshold and a low temperature threshold across the first time interval and the second time interval.

In some embodiments, the other pre-conditioning operations include a fifth pre-conditioning operation including initiating a hydraulic heating action based on an environmental temperature during at least one of the first time interval or the second time interval so that a temperature at a hydraulic of the refuse vehicle is substantially equal to a desired temperature at the scheduled deployment time. In some embodiments, the pre-conditioning operations include a sixth pre-conditioning operation including sending a request to devices on a controller area network (CAN) bus, monitoring a reply from each of the devices on the CAN bus, and determining, based on the reply or a presence of the reply from each of the devices on the CAN bus, which of the devices are communicating properly, and which are not communicating properly.

Another implementation of the present disclosure is a refuse vehicle including processing circuitry, according to some embodiments. In some embodiments, the processing circuitry is configured to obtain a scheduled deployment time of the refuse vehicle and perform a first pre-conditioning operation. In some embodiments, performing the first pre-conditioning operation includes operating a charging system to charge batteries of the vehicle at a first charge rate over a first time interval, and a second charge rate over a second time interval to fully charge the batteries by the scheduled deployment time. In some embodiments, the charging system is configured to provide electrical energy to the batteries for charging. In some embodiments, the first charge rate is less than the second charge rate and the first time interval is greater than the second time interval. In some embodiments, the batteries are configured to provide electrical energy for driving tractive elements of the refuse vehicle. In some embodiments, the processing circuitry is also configured to perform other pre-conditioning operations at least partially simultaneously with performing the first pre-conditioning operation.

In some embodiments, the other pre-conditioning operations include a second pre-conditioning operation including operating an HVAC system for a cab of the vehicle to drive a temperature of the cab to be within a high temperature threshold and a low temperature threshold by the scheduled deployment time. In some embodiments, the pre-conditioning operations include a third pre-conditioning operation including activating a defrost operation of the HVAC system for the cab of the vehicle to defrost a window of the vehicle by the scheduled deployment time.

In some embodiments, the pre-conditioning operations include a fourth pre-conditioning operation including operating a thermal management system of the refuse vehicle to maintain a temperature at the batteries within a high temperature threshold and a low temperature threshold across the first time interval and the second time interval. In some embodiments, the pre-conditioning operations include a fifth pre-conditioning operation including initiating a hydraulic heating action based on an environmental temperature during at least one of the first time interval or the second time interval so that a temperature at a hydraulic of the refuse vehicle is substantially equal to a desired temperature at the scheduled deployment time.

In some embodiments, the pre-conditioning operations include a sixth pre-conditioning operation including sending a request to each of the devices on a controller area network (CAN) bus, and monitoring a reply from the devices on the CAN bus. In some embodiments, the pre-conditioning operations further include determining, based on the reply or a presence of the reply from each of the devices on the CAN bus, which of the devices are communicating properly, and which are not communicating properly.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

Referring to the figures generally, the various exemplary embodiments disclosed herein relate to a vehicle including a control system for pre-conditioning the vehicle. The vehicle may include batteries, and one of the pre-conditioning operations may be charging the batteries using DC-DC charging prior to a scheduled deployment time. The batteries may be charged at a trickle or low charge rate over a first time interval, and then increased to a higher charge rate immediately before the scheduled deployment time. The pre-conditioning operations can also include heating or cooling a cab of the vehicle so that the cab of the vehicle is at a desired temperature and/or humidity by the scheduled deployment time. The pre-conditioning operations can also include defrosting a windshield of the vehicle so that the windshield is defrosted by the scheduled deployment time. The pre-conditioning operations can also include heating or cooling or ventilating the batteries as the batteries charge and/or discharge, so that the batteries are maintained within temperature threshold boundaries. The pre-conditioning operations can also include heating hydraulics of the vehicle so that the hydraulic fluid is at a desired or operating temperature by the scheduled deployment time.

Vehicle

Figure 1:
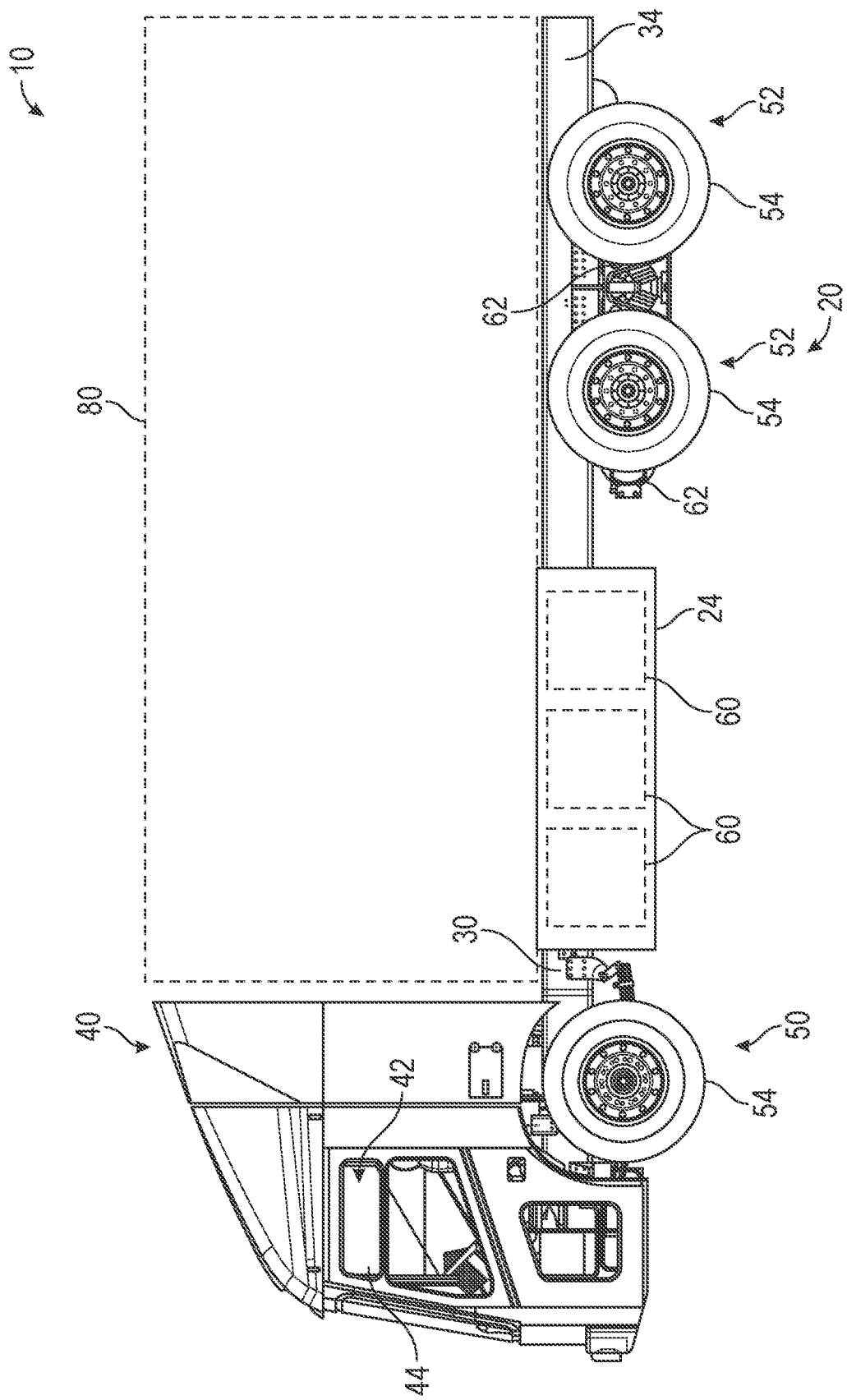
FIG. 1 is a left side view of a vehicle, according to an exemplary embodiment.
Figure 2:
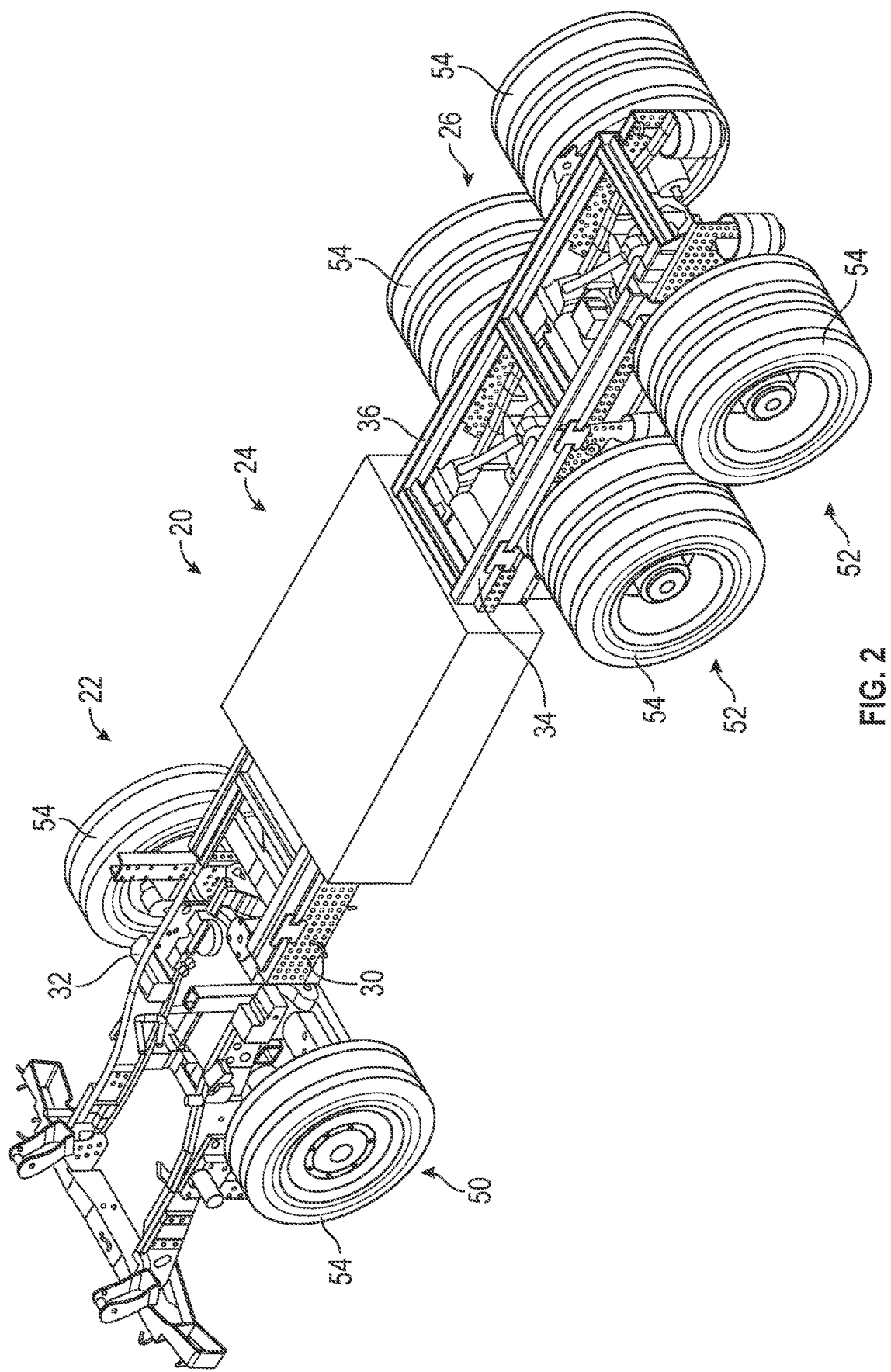
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a plurality of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 54 and provide electrical energy to the batteries 60, providing a braking force to slow the vehicle 10. As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-8 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

Figure 3:
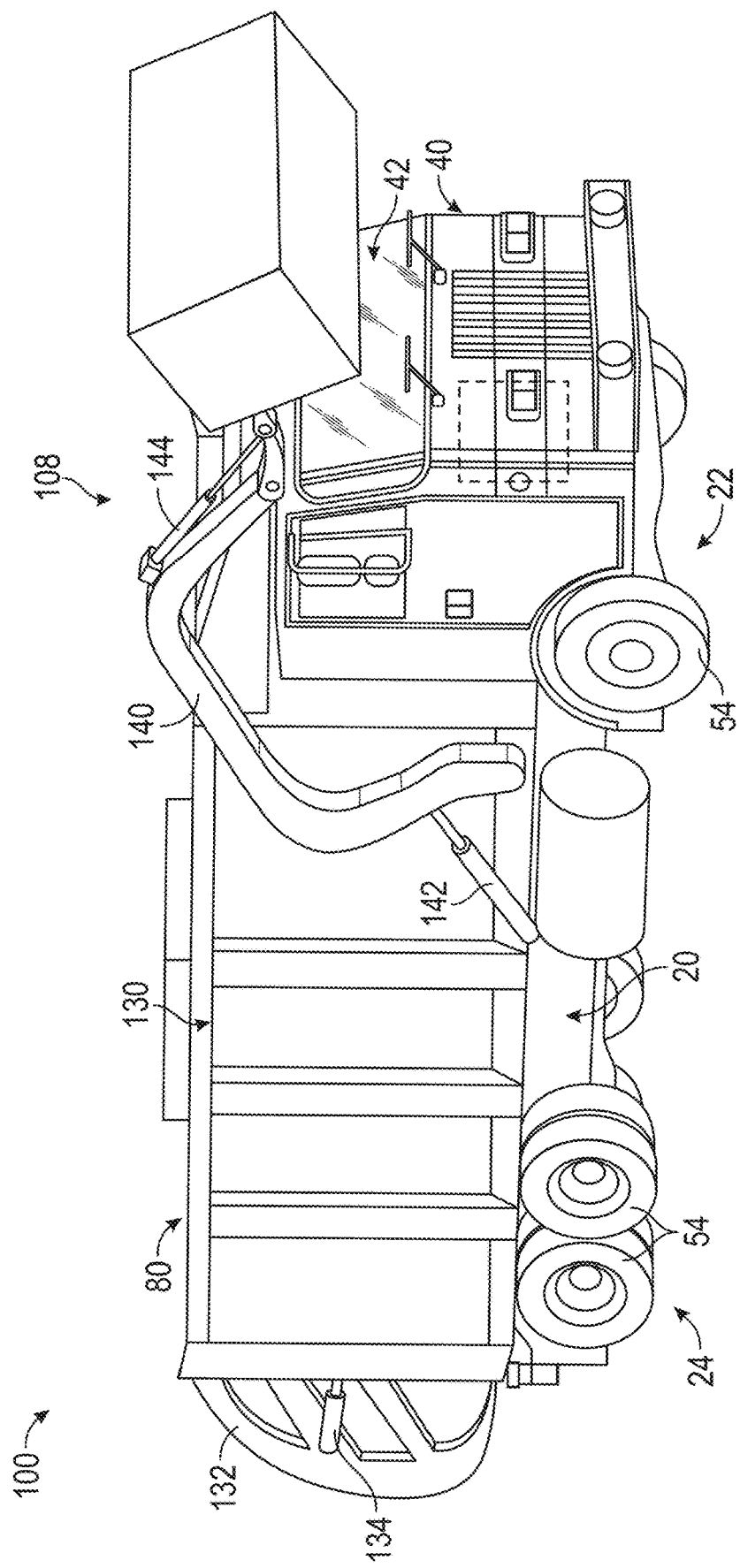
FIG. 3 is a perspective view of the vehicle of FIG. 1 configured as a refuse vehicle, according to an exemplary embodiment.

Referring now to FIG. 3, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a side-loading refuse vehicle.

As shown in FIG. 3, the application kit 80 of the refuse vehicle 100 includes a rear body or container, shown as refuse compartment 130, and a pivotable rear portion, shown as tailgate 132. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted. The refuse compartment 130 may also provide temporary storage for refuse during transport to a waste disposal site and/or a recycling facility. In some embodiments, the refuse compartment 130 may include a hopper volume and storage volume. In this regard, refuse may be initially loaded into the hopper volume and later compacted into the storage volume. According to an exemplary embodiment, the hopper volume may be positioned between the storage volume and the cab 40 (e.g., refuse is loaded into a position of the refuse compartment 130 behind the cab 40 and stored in a position further toward the rear of the refuse compartment 130). In other embodiments, the storage volume may be positioned between the hopper volume and the cab 40 (e.g., in a rear-loading refuse truck, etc.). The tailgate 132 may be pivotally coupled to the refuse compartment 130, and may be movable between a closed position and an open position by an actuator (e.g., a hydraulic cylinder, an electric linear actuator, etc.), shown as tailgate actuator 134 (e.g., to facilitate emptying the storage volume).

As shown in FIG. 3, the refuse vehicle 100 also includes an implement, shown as lift assembly 108 (e.g., a front-loading lift assembly, etc.). According to an exemplary embodiment, the lift assembly 108 includes a pair of lift arms 140, lift arm actuators 142, and articulation actuators 144. The lift arms 140 may be rotatably coupled to the chassis 20 and/or the refuse compartment 130 on each side of the refuse vehicle 100 (e.g., through a pivot, a lug, a shaft, etc.), such that the lift assembly 108 may extend forward relative to the cab 40 (e.g., a front-loading refuse truck, etc.). In other embodiments, the lift assembly 108 may extend rearward relative to the application kit 80 (e.g., a rear-loading refuse truck). In yet other embodiments, the lift assembly 108 may extend from a side of the application kit 80 (e.g., a side-loading refuse truck). As shown in FIG. 3, in an exemplary embodiment the lift arm actuators 142 may be positioned such that extension and retraction of the lift arm actuators 142 rotates the lift arms 140 about an axis extending through the pivot. In this regard, the lift arms 140 may be rotated by the lift arm actuators 142 to lift a refuse container over the cab 40. In an exemplary embodiment, the articulation actuators 144 may be positioned to articulate the distal end of the lift arms 140 (e.g., a portion of the lift arms 140 that may be coupled to the refuse container), in order to assist in tipping refuse out of the refuse container and into the refuse compartment 130. The lift arm actuators 142 may then rotate the lift arms 140 to return the empty refuse container to the ground.

Figure 4:
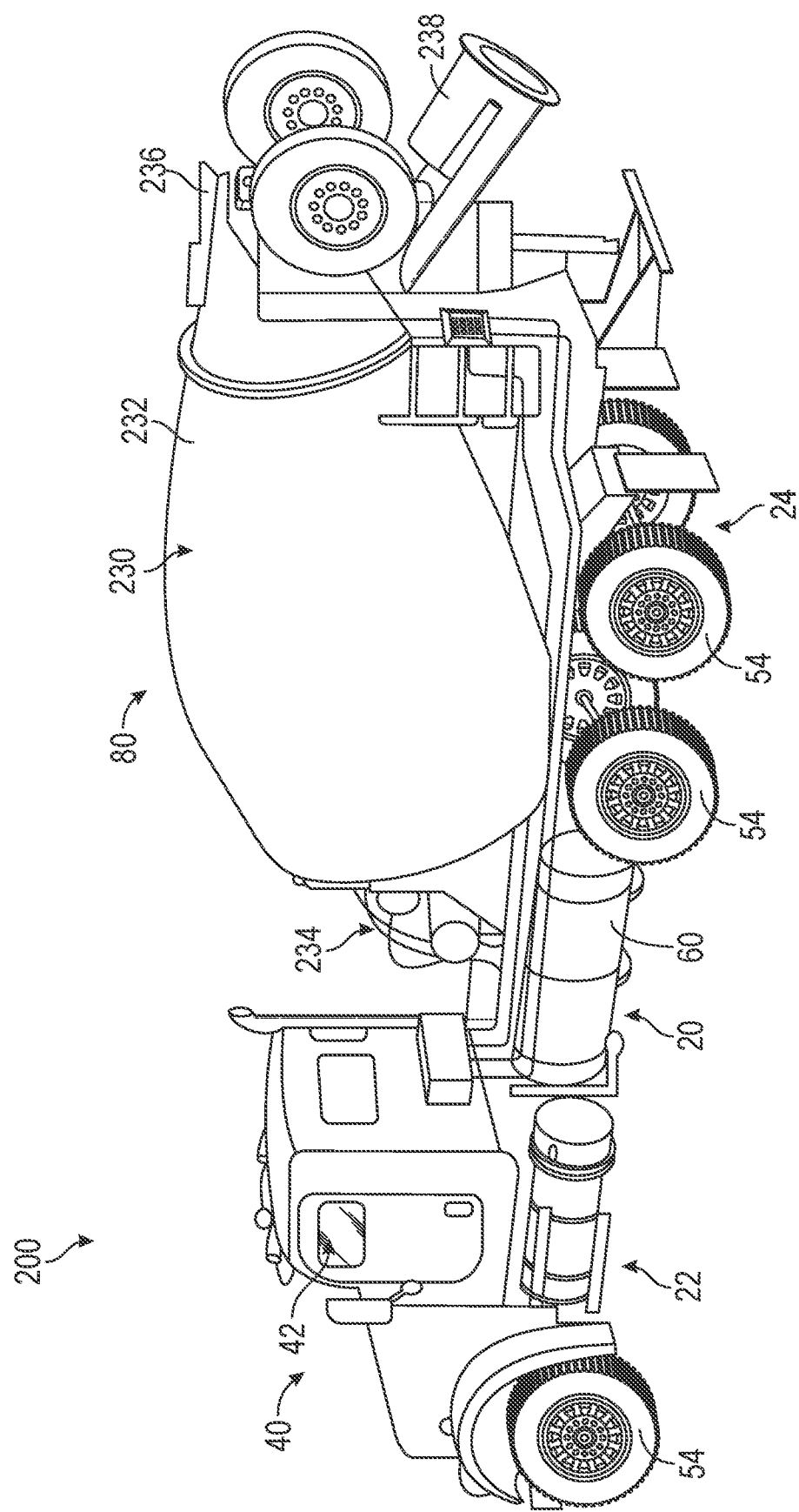
FIG. 4 is a perspective view of the vehicle of FIG. 1 configured as a mixer vehicle, according to an exemplary embodiment.

Referring now to FIG. 4, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 4, the application kit 80 includes a mixing drum assembly (e.g., a concrete mixing drum), shown as drum assembly 230. The drum assembly 230 may include a mixing drum 232, a drum drive system 234 (e.g., a rotational actuator or motor), an inlet, shown as hopper 236, and an outlet, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plan extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

Figure 5:
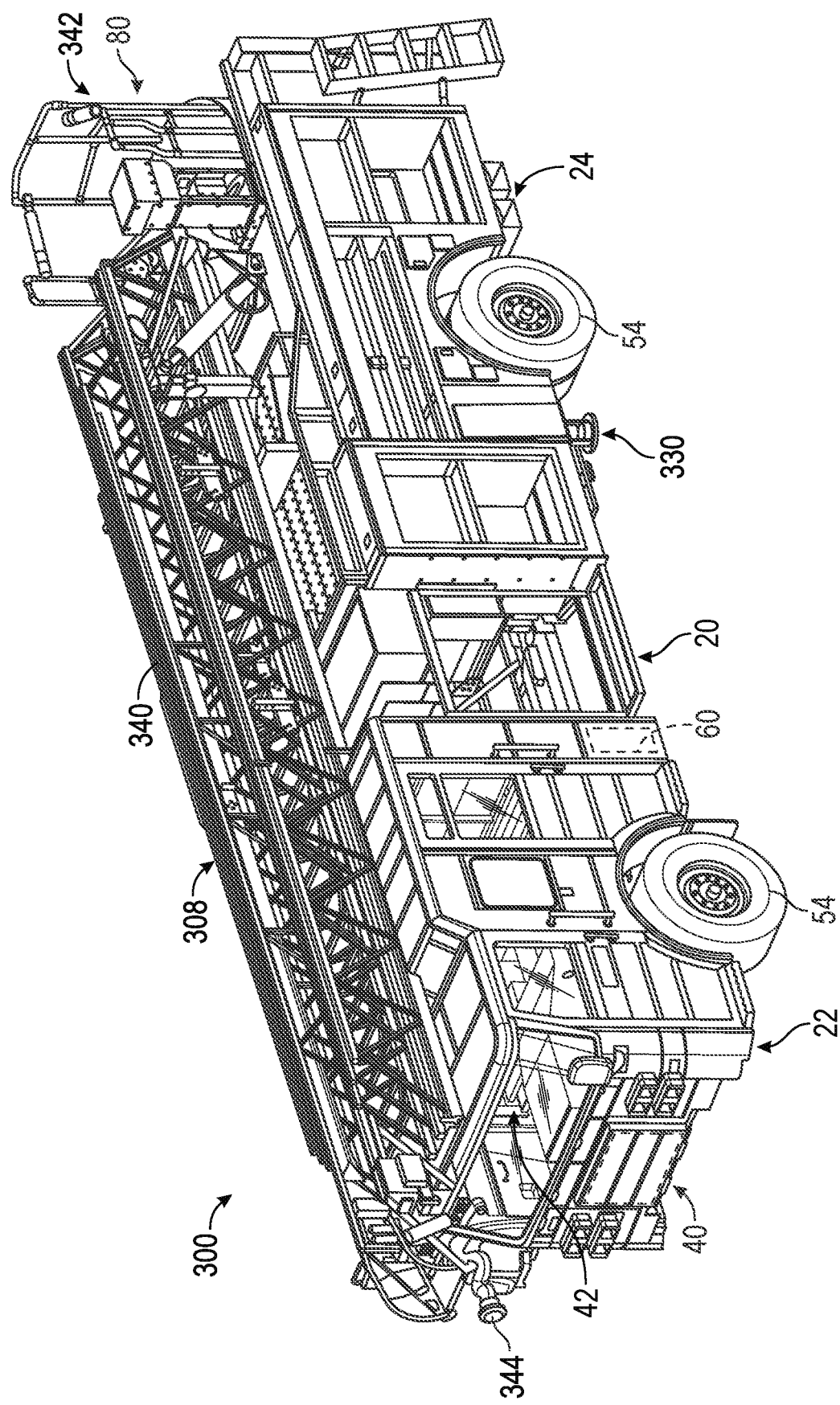
FIG. 5 is a perspective view of the vehicle of FIG. 1 configured as a fire fighting vehicle, according to an exemplary embodiment.

Referring now to FIG. 5, the vehicle 10 is configured as a fire fighting vehicle or fire apparatus (e.g., a turntable ladder truck, a pumper truck, a quint, etc.), shown as fire fighting vehicle 300. In the embodiment shown in FIG. 5, the fire fighting vehicle 300 is configured as a rear-mount aerial ladder truck. In other embodiments, the fire fighting vehicle 300 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 5, in the fire fighting vehicle 300, the application kit 80 is positioned mainly rearward from the cab 40. The application kit 80 includes deployable stabilizers (e.g., outriggers, downriggers, etc.), shown as outriggers 330, that are coupled to the chassis 20. The outriggers 330 may be configured to selectively extend from each lateral side and/or the rear of the fire fighting vehicle 300 and engage a support surface (e.g., the ground) in order to provide increased stability while the fire fighting vehicle 300 is stationary. This increased stability is desirable when the ladder assembly 308 is in use (e.g., extended from the fire fighting vehicle 300) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 5, the application kit 80 includes a ladder assembly 308 coupled to the chassis 20. The ladder assembly 308 includes a series of ladder sections 340 that are slidably coupled with one another such that the ladder sections 340 may extend and/or retract (e.g., telescope) relative to one another to selectively vary a length of the ladder assembly 308. A base platform, shown as turntable 342, is rotatably coupled to the chassis 20 and to a proximal end of a base ladder section 340 (i.e., the most proximal of the ladder sections 340). The turntable 342 may be configured to rotate about a vertical axis relative to the chassis 20 to rotate the ladder sections 340 about the vertical axis (e.g., up to 360 degrees, etc.). The ladder sections 340 may rotate relative to the turntable 342 about a substantially horizontal axis to selectively raise and lower the ladder sections 340 relative to the chassis 20. As shown, a water turret or implement, shown as monitor 344, is coupled to a distal end of a fly ladder section 340 (i.e., the most distal of the ladder sections 340). The monitor 344 may be configured to expel water and/or a fire suppressing agent (e.g., foam, etc.) from a water storage tank and/or an agent tank onboard the fire fighting vehicle 300, and/or from an external source (e.g., a fire hydrant, a separate water/pumper truck, etc.). In some embodiments, the ladder assembly 308 further includes an aerial platform coupled to the distal end of the fly ladder section 340 and configured to support one or more operators.

Figure 6:
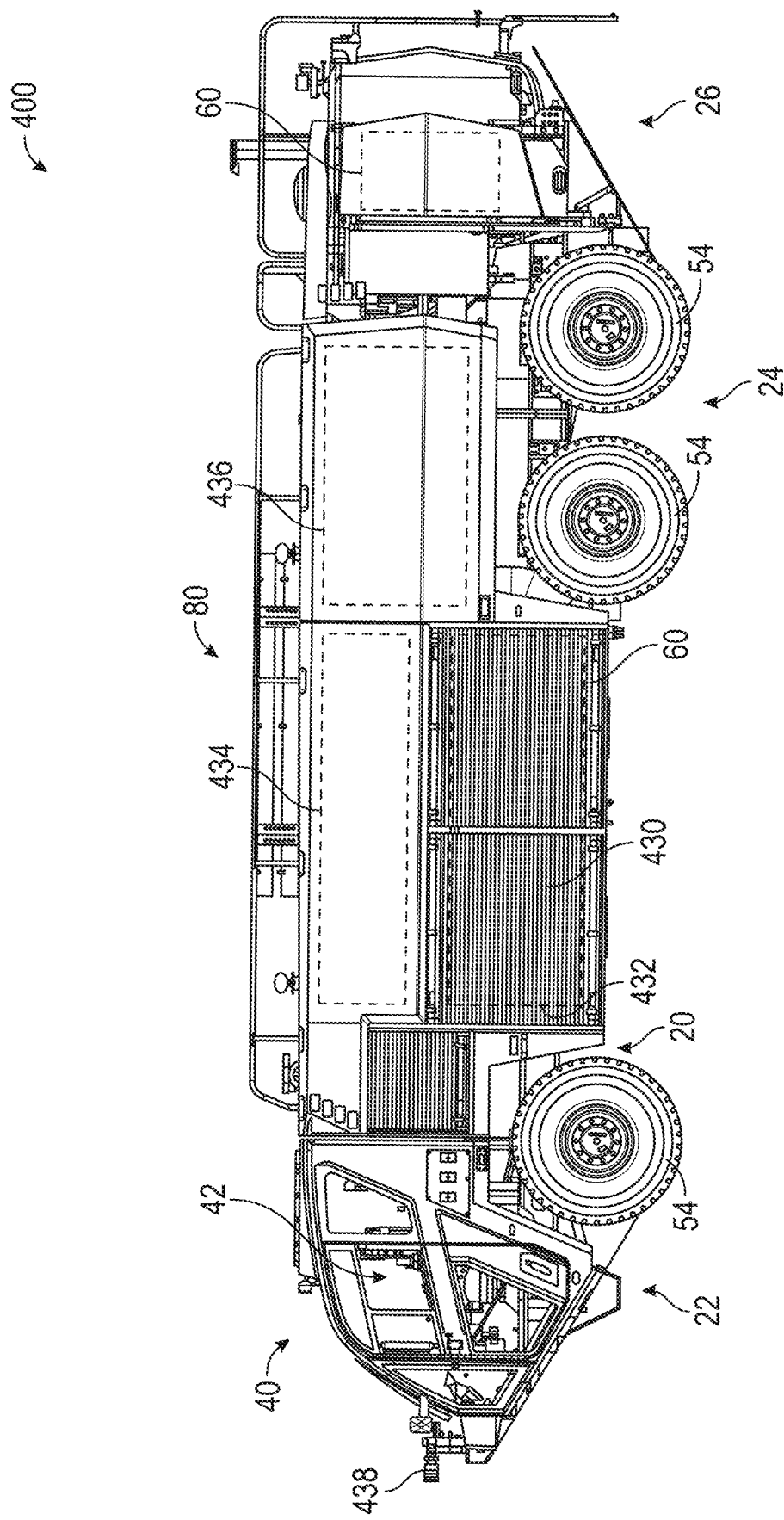
FIG. 6 is a left side view of the vehicle of FIG. 1 configured as an airport fire fighting vehicle, according to an exemplary embodiment.

Referring now to FIG. 6, the vehicle 10 is configured as a fire fighting vehicle, shown as airport rescue and fire fighting (ARFF) truck 400. As shown in FIG. 6, the application kit 80 is positioned primarily rearward of the cab 40. As shown, the application kit 80 includes a series of storage compartments or cabinets, shown as compartments 430, that are coupled to the chassis 20. The compartments 430 may store various equipment or components of the ARFF truck 400.

The application kit 80 includes a pump system 432 (e.g., an ultra-high-pressure pump system, etc.) positioned within one of the compartments 430 near the center of the ARFF truck 400. The application kit 80 further includes a water tank 434, an agent tank 436, and an implement or water turret, shown as monitor 438. The pump system 432 may include a high pressure pump and/or a low pressure pump, which may be fluidly coupled to the water tank 434 and/or the agent tank 436. The pump system 432 may to pump water and/or fire suppressing agent from the water tank 434 and the agent tank 436, respectively, to the monitor 438. The monitor 438 may be selectively reoriented by an operator to adjust a direction of a stream of water and/or agent. As shown in FIG. 6, the monitor 438 is coupled to a front end of the cab 40.

Figure 7:
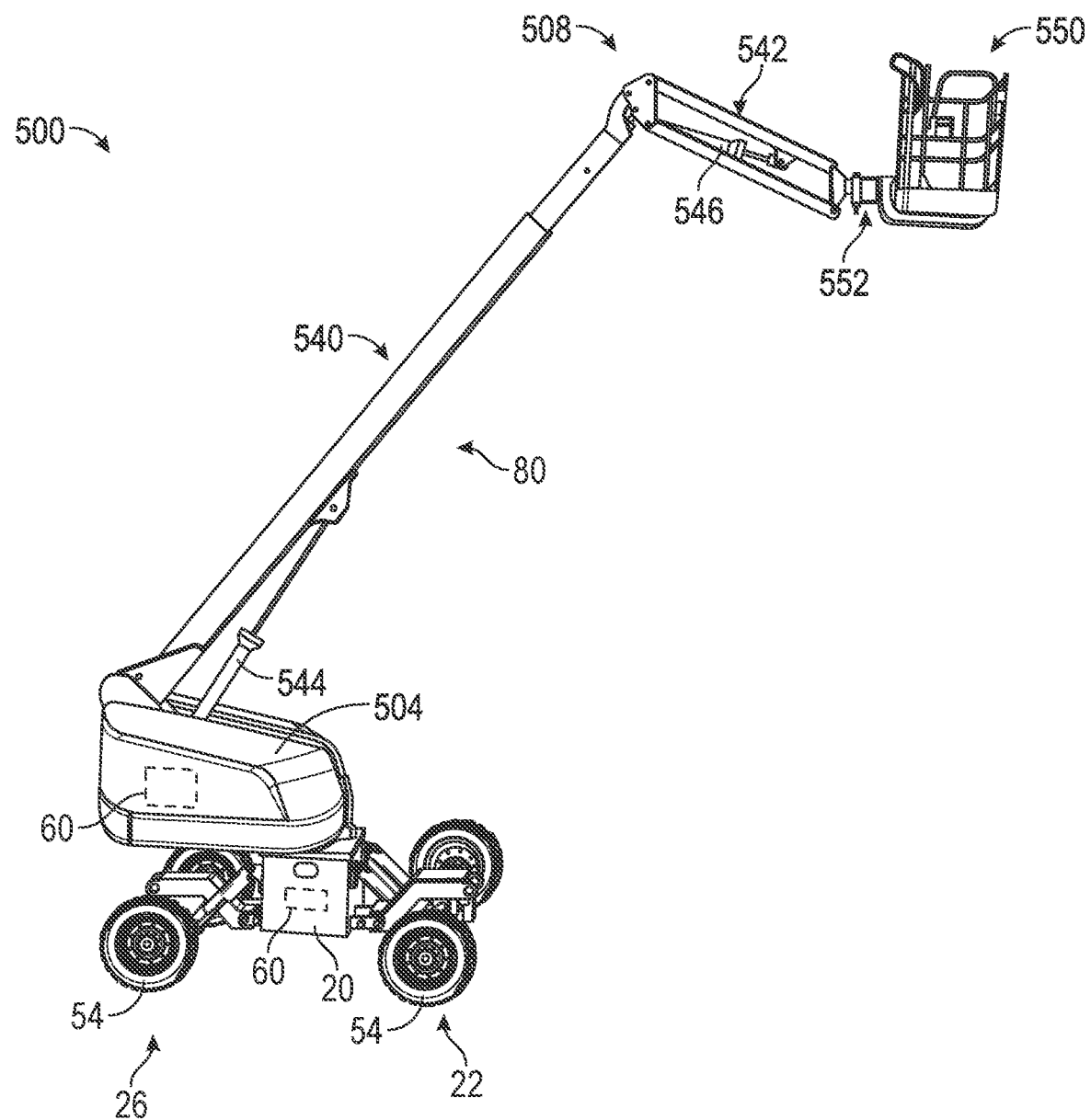
FIG. 7 is a perspective view of the vehicle of FIG. 1 configured as a boom lift, according to an exemplary embodiment.

Referring now to FIG. 7, the vehicle 10 is configured as a lift device, shown as boom lift 500. The boom lift 500 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 7, the application kit 80 includes a base assembly, shown as turntable 504, that is rotatably coupled to the chassis 20. The turntable 504 may be configured to selectively rotate relative to the chassis 20 about a substantially vertical axis. In some embodiments, the turntable 504 includes a counterweight positioned near the rear of the turntable 504. The turntable 504 is rotatably coupled to a lift assembly, shown as boom assembly 508. The boom assembly 508 includes a first section or telescoping boom section, shown as lower boom 540. The lower boom 540 includes a series of nested boom sections that extend and retract (e.g., telescope) relative to one another to vary a length of the boom assembly 508. The boom assembly 508 further includes a second boom section or four bar linkage, shown as upper boom 542. The upper boom 542 may includes structural members that rotate relative to one another to raise and lower a distal end of the boom assembly 508. In other embodiments, the boom assembly 508 includes more or fewer boom sections (e.g., one, three, five, etc.) and/or a different arrangement of boom sections.

As shown in FIG. 7, the boom assembly 508 includes a first actuator, shown as lower lift cylinder 544. The lower boom 540 is pivotally coupled (e.g., pinned, etc.) to the turntable 504 at a joint or lower boom pivot point. The lower lift cylinder 544 (e.g., a pneumatic cylinder, an electric actuator, a hydraulic cylinder, etc.) is coupled to the turntable 504 at a first end and coupled to the lower boom 540 at a second end. The lower lift cylinder 544 may be configured to raise and lower the lower boom 540 relative to the turntable 504 about the lower boom pivot point.

The boom assembly 508 further includes a second actuator, shown as upper lift cylinder 546. The upper boom 542 is pivotally coupled (e.g., pinned) to the upper end of the lower boom 540 at a joint or upper boom pivot point. The upper lift cylinder 546 (e.g., a pneumatic cylinder, an electric actuator, a hydraulic cylinder, etc.) is coupled to the upper boom 542. The upper lift cylinder 546 may be configured to extend and retract to actuate (e.g., lift, rotate, elevate, etc.) the upper boom 542, thereby raising and lowering a distal end of the upper boom 542.

Referring still to FIG. 7, the application kit 80 further includes an operator platform, shown as platform assembly 550, coupled to the distal end of the upper boom 542 by an extension arm, shown as jib arm 552. The jib arm 552 may be configured to pivot the platform assembly 550 about a lateral axis (e.g., to move the platform assembly 550 up and down, etc.) and/or about a vertical axis (e.g., to move the platform assembly 550 left and right, etc.).

The platform assembly 550 provides a platform configured to support one or more operators or users. In some embodiments, the platform assembly 550 may include accessories or tools configured for use by the operators. For example, the platform assembly 550 may include pneumatic tools (e.g., an impact wrench, airbrush, nail gun, ratchet, etc.), plasma cutters, welders, spotlights, etc. In some embodiments, the platform assembly 550 includes a control panel (e.g., a user interface, a removable or detachable control panel, etc.) configured to control operation of the boom lift 500 (e.g., the turntable 504, the boom assembly 508, etc.) from the platform assembly 550 or remotely. In other embodiments, the platform assembly 550 is omitted, and the boom lift 500 includes an accessory and/or tool (e.g., forklift forks, etc.) coupled to the distal end of the boom assembly 508.

Figure 8:
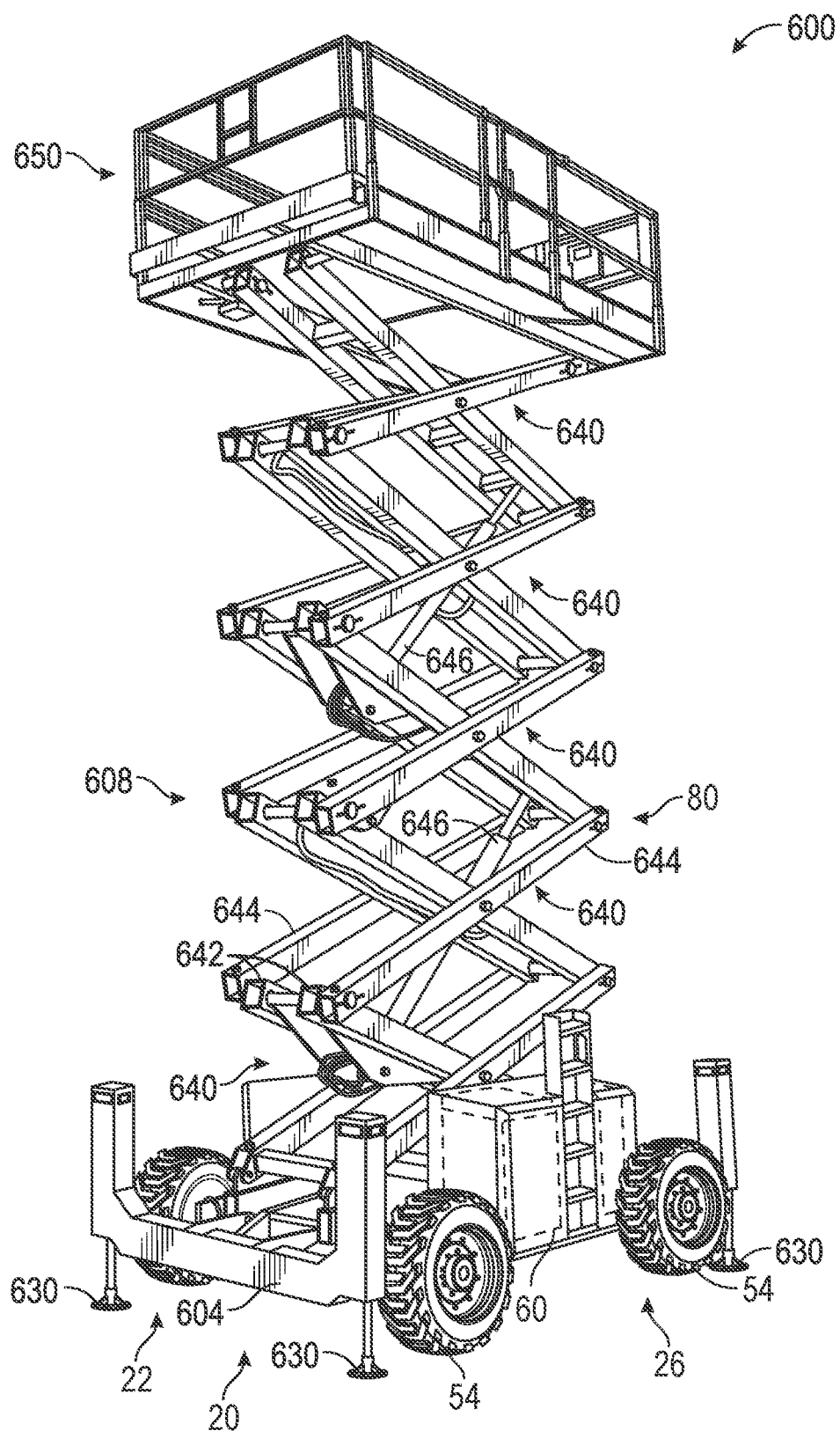
FIG. 8 is a perspective view of the vehicle of FIG. 1 configured as a scissor lift, according to an exemplary embodiment.

Referring now to FIG. 8, the vehicle 10 is configured as a lift device, shown as scissor lift 600. As shown in FIG. 8, the application kit 80 includes a body, shown as lift base 604, coupled to the chassis 20. The lift base 604 is coupled to a scissor assembly, shown as lift assembly 608, such that the lift base 604 supports the lift assembly 608. The lift assembly 608 is configured to extend and retract, raising and lowering between a raised position and a lowered position relative to the lift base 604.

As shown in FIG. 8, the lift base 604 includes a series of actuators, stabilizers, downriggers, or outriggers, shown as leveling actuators 630. The leveling actuators 630 may extend and retract vertically between a stored position and a deployed position. In the stored position, the leveling actuators 630 may be raised, such that the leveling actuators 630 do not contact the ground. Conversely, in the deployed position, the leveling actuators 630 may engage the ground to lift the base assembly 604. The length of each of the leveling actuators 630 in their respective deployed positions may be varied in order to adjust the pitch (e.g., rotational position about a lateral axis) and the roll (e.g., rotational position about a longitudinal axis) of the base assembly 604 and/or the chassis 20. Accordingly, the lengths of the leveling actuators 630 in their respective deployed positions may be adjusted to level the base assembly 604 with respect to the direction of gravity (e.g., on uneven, sloped, pitted, etc. terrain). The leveling actuators 630 may lift the wheel and tire assemblies 54 off of the ground to prevent movement of the scissor lift 600 during operation. In other embodiments, the leveling actuators 630 are omitted.

The lift assembly 608 may include a series of subassemblies, shown as scissor layers 640, each including a pair of inner members 642 and a pair of outer members 644. The scissor layers 640 may be stacked atop one another in order to form the lift assembly 608. The inner members 642 may be pivotally coupled to the outer members 644 near the center of both the inner members 642 and the outer members 644. In this regard, the inner members 642 may pivot relative to the outer members 644 about a lateral axis. Each of the inner members 642 and the outer members 644 may include a top end and a bottom end. The bottom end of each inner member 642 may be pivotally coupled to the top end of the outer member 644 immediately below it, and the bottom end of each outer member 644 may be pivotally coupled to the top end of the inner member immediately below it. Accordingly, each of the scissor layers 640 may be coupled to one another such that movement of one scissor layer 640 causes a similar movement in all of the other scissor layers 640. The bottom ends of the inner member 642 and the outer member 644 that make up the lowermost scissor layer 640 may be coupled to the base assembly 604. The top beds of the inner member 642 and the outer member 644 that make up the uppermost scissor layer 640 may be coupled to the platform assembly 650. In some embodiments, scissor layers 640 may be added to, or removed from, the lift assembly 608 in order to increase, or decrease, the fully extended height of the lift assembly 608.

Referring still to FIG. 8, the lift assembly 608 may also include one or more lift actuators 646 (e.g., hydraulic cylinders, pneumatic cylinders, motor-driven leadscrews, etc.) configured to extend and retract the lift assembly 608. The lift actuators 646 may be pivotally coupled to an inner member 642 at a first end and pivotally coupled to an inner member 642 of another scissor layer 640 at a second end. In an exemplary embodiment, these inner members 642 may belong to a first scissor layer 640 and a second scissor layer 640 (which may be separated by a third scissor layer 640). In other embodiments, the lift actuators 646 may be arranged in other configurations (e.g., the first scissor layer 640 and the second scissor layer 640 are not separated by a third scissor layer 640, etc.).

A distal or upper end of the lift assembly 608 is coupled to an operator platform, shown as platform assembly 650. The lift actuators 646 may be configured to actuate the lift assembly 608 to selectively reposition the platform assembly 650 between a lowered position (e.g., where the platform assembly 650 is proximate to the lift base 604) and a raised position (e.g., where the platform assembly 650 is at an elevated height relative to the lift base 604). Specifically, in some embodiments, extension of the lift actuators 646 moves the platform assembly 650 upward (e.g., extending the lift assembly 608), and retraction of the lift actuators 646 moves the platform assembly 650 downward (e.g., retracting the lift assembly 608). In other embodiments, extension of the lift actuators 646 retracts the lift assembly 608, and retraction of the lift actuators 646 extends the lift assembly 608. In some embodiments, the outer members 644 are parallel to and/or in contact with one another when the lift assembly 608 is in the stored position.

In some embodiments, the platform assembly 650 includes a platform that is configured to support one or more operators or users. Similar to the platform assembly 550, the platform assembly 650 may include accessories or tools (e.g., pneumatic tools, plasma cutters, welders, spotlights, etc.) configured for use by an operator. The platform assembly 650 may include a control panel to control operation of the scissor lift 600.

Pre-Conditioning Control System

Figure 9A:
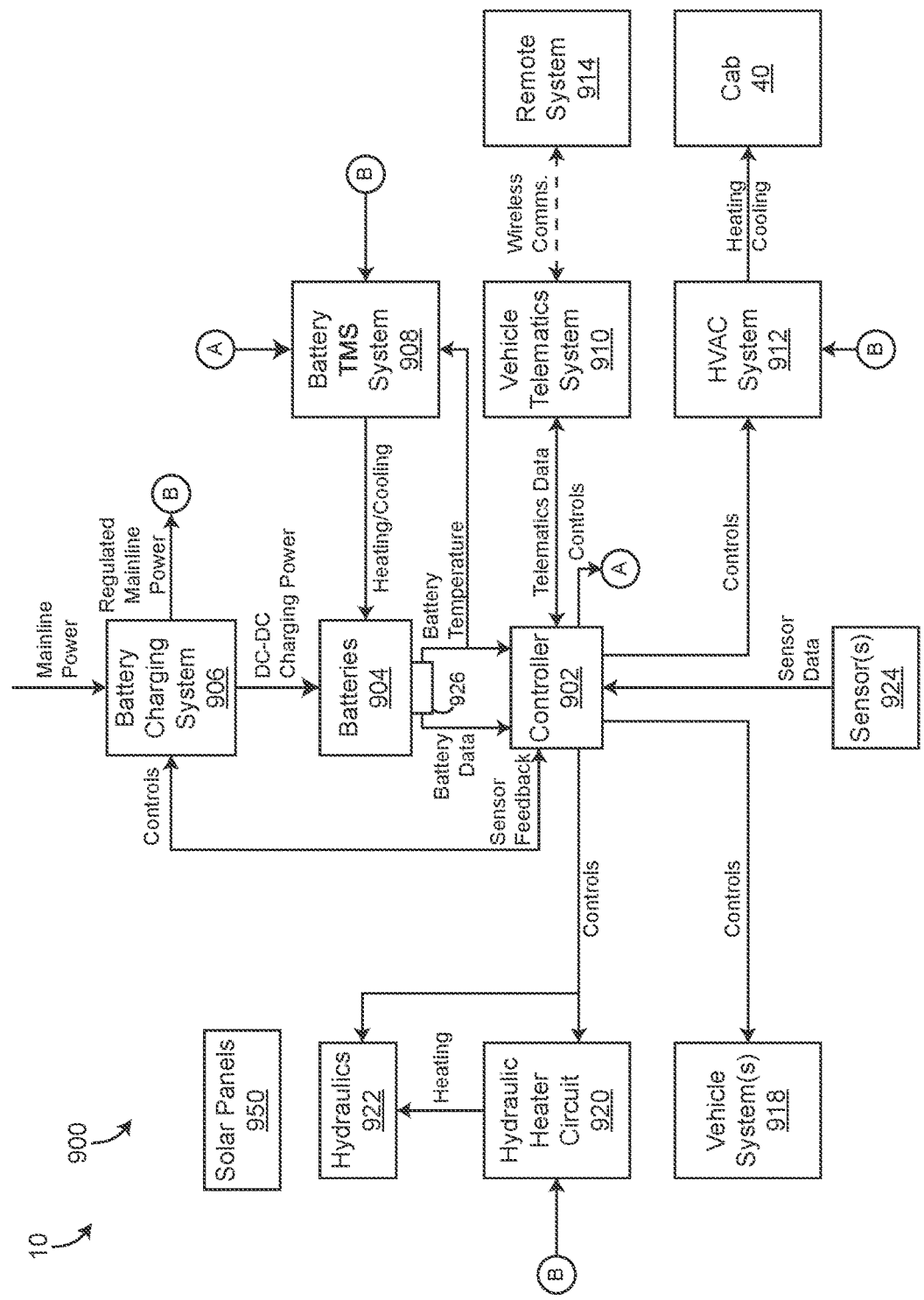
FIG. 9A is a block diagram of a control system for pre-conditioning and controlling of any of the vehicles of FIGS. 1-8, according to an exemplary embodiment.
Figure 9B:
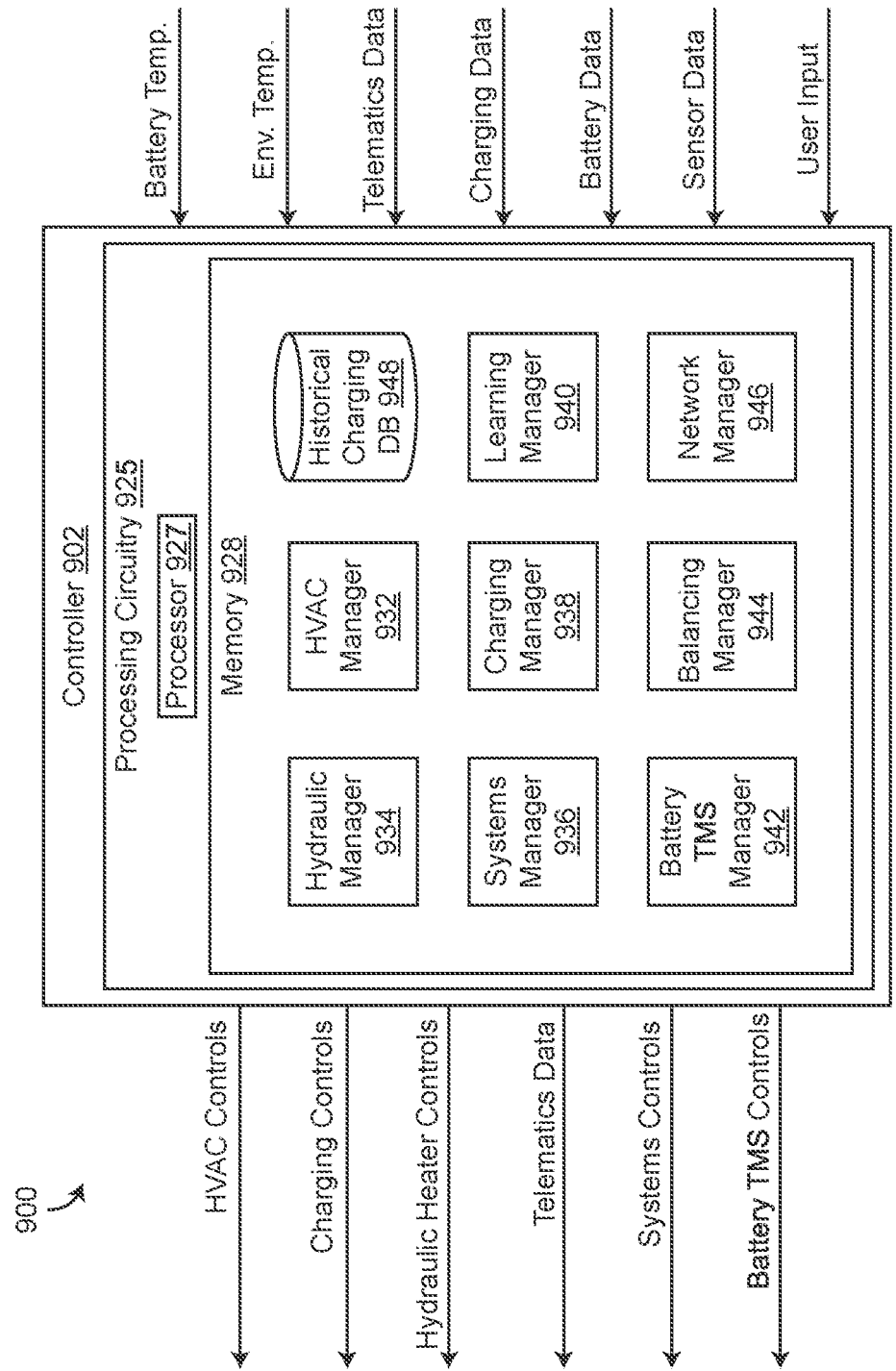
FIG. 9B is a block diagram of a controller of the control system of FIG. 9A, according to an exemplary embodiment.

Referring to FIGS. 9A-9B, a control system 900 for pre-conditioning the vehicle 10 is configured to operate various systems, sub-systems, components, etc., of the vehicle 10 or a charging station, according to an exemplary embodiment. The control system 900 prepares the vehicle 10 for use (e.g., to perform a task, to follow a route, etc.) by adjusting one or more conditions of the vehicle 10 or systems thereof (e.g., charging batteries of the vehicle 10 prior to a scheduled use time, pre-heating or pre-cooling the cab 40 or other passenger compartment of the vehicle 10 before occupancy, pre-heating a hydraulic circuit of the vehicle 10, defrosting the vehicle 10, etc.). The control system 900 includes a controller 902 that is configured to obtain various data (e.g., sensor data, operational data, system data, etc.) from various sensors, systems, or components of the vehicle 10, or from a remote system (e.g., via a telematics system). The controller 902 is configured to initiate one or more pre-conditioning operations or processes prior to occupancy or deployment of the vehicle 10 in order to ready the vehicle 10 for deployment and/or occupancy. For example, the control system 900 may initiate or perform pre-conditioning operations so that one or more parameters of the vehicle 10 (e.g., battery charge level, cab temperature, etc.) are substantially equal to a desired value, or within a desired range.

In some embodiments, the pre-conditioning techniques described herein are initiated or performed responsive to batteries 904 (e.g., batteries 60) of the vehicle 10 being coupled with a battery charging system 906. Initiating the pre-conditioning techniques after electrically coupling the batteries 904 of the vehicle 10 with the charging system 906 facilitates the various systems or components of the vehicle 10 to draw power from the charging system 906 (e.g., through the batteries 904) so that the batteries 904 are not depleted due to performing the pre-conditioning techniques. The charging system 906 may receive mainline power and provide DC-DC charging power to the batteries 904. The charging system 906 can also provide regulated mainline power to any of the electrical components or components of a thermal management system of the vehicle 10. In some embodiments, the battery charging system 906 includes a DC power converter. For example, the mainline power may be provided as AC electrical energy, and the battery charging system 906 may convert the AC electrical energy to DC electrical energy. The DC electrical energy can then be provided to the batteries 904 for charging. The regulated mainline power can be DC or AC energy that is provided to any of the systems or components shown. In some embodiments, the regulated mainline power is provided to any of the systems or components shown without flowing through the batteries 904 to facilitate improving a lifetime of the batteries 904. In some embodiments, the batteries 904 are high voltage (HV) batteries.

In some embodiments, the controller 902 is configured to operate or provide control signals to various systems of the vehicle 10 to perform the pre-conditioning techniques described herein. In some embodiments, the controller 902 or the vehicle telematics system 910 is configured to wake up other controllers of any of the systems or components described herein (e.g., in response to environmental temperature), and provide instructions or controls to the controllers of the systems or components of the vehicle 10 so that the controllers can each implement a subset of the pre-conditioning techniques. In some embodiments, the controller 902 is a controller on a Controller Area Network (CAN) bus, and the controller 902 is configured to communicate with any sensors, controllers, systems, engine control units (ECUs), etc., of the vehicle 10 to obtain data from any device in communication with the CAN bus, and to provide controls to any device in communication with the CAN bus.

Referring still to FIG. 9A, the control system 900 includes the controller 902, a vehicle telematics system 910, a heating, ventilation, and/or air conditioning (HVAC) system 912, a battery thermal management system (TMS) 908, the batteries 904 of the vehicle 10, the battery charging system 906, vehicle systems 918, sensors 924, a hydraulic heater circuit 920 (e.g., a bypass loop), and hydraulics 922. The HVAC system 912 can be configured to provide heating or cooling to the cab 40 to adjust a temperature $T_{cab}$ within the cab 40. In some embodiments, the HVAC system 912 is configured to provide heating or cooling to any other occupant portion of the vehicle 10 (e.g., operate a seat heater, heat a passenger cab, etc.). In some embodiments, the HVAC system 912 is configured to provide ventilation to the cab 40 (e.g., drive an airflow into the cab 40). The HVAC system 912 may include a compressor, a condenser, an expansion valve, an evaporator, etc. In some embodiments, the battery TMS 908, the HVAC system 912, the hydraulic heater circuit 920, or any other components of a thermal management system of the vehicle 10 receive regulated mainline power from the battery charging system 906 so that the power drawn by the components or sub-systems of the thermal management system of the vehicle 10 as described herein do not draw power through the batteries 904 to preserve life of the batteries 904 and reduce a degradation rate of the batteries 904. In some embodiments, the battery TMS 908, the HVAC system 912, and the hydraulic heater circuit 920 are configured to electrically couple with the mainline power source through an electrical connection separate from the battery charging system 906.

The hydraulic heater circuit 920 may be configured to provide heating to a hydraulic component of the vehicle 10 (e.g., the hydraulics 922), a hydraulic reservoir, a hydraulic pump, hydraulic lines, etc. In some embodiments, the hydraulic fluid of the various hydraulic components of the vehicle 10 should be at a particular operating temperature. If the environmental or ambient temperature surrounding the vehicle 10 is low (e.g., below the operating temperature), the hydraulic heater circuit 920 can facilitate increasing the temperature of the hydraulic fluid until the hydraulic fluid is at the operating temperature. The hydraulic heater circuit 920 can use any resistive heating elements, inductive heating elements, conductive heating elements, etc.

The vehicle telematics system 910 is configured to wirelessly communicate with a remote system 914, according to some embodiments. The remote system 914 may be a fleet management system, a database, a client system, etc. In some embodiments, the remote system 914 is configured to provide dashboards, visualizations, tabular data, etc., of any of the vehicle 10 or a fleet of vehicles 10. The remote system 914 can be configured to plan or provide different routes for the vehicle 10 to the controller 902 via the vehicle telematics system 910. The remote system 914 may also provide a deployment time t deploy to the controller 902 via the vehicle telematics system 910. The vehicle telematics system 910 may be configured to communicate with the remote system 914 via a cellular dongle, via a wireless radio, etc., or any other wireless transceiver. The vehicle telematics system 910 can also include a global positioning system (GPS) unit or functionality for tracking a geographic location of the vehicle 10. The geographic location of the vehicle 10 may be provided to the remote system 914 for tracking of the vehicle 10. In some embodiments, the vehicle telematics system 910 also includes a real-time clock that is used by the controller 902 to determine a current time (e.g., and to determine when to initiate various operations).

The battery TMS 908 is configured to provide heating or cooling to the batteries 904, according to some embodiments. For example, the batteries 904 of the vehicle 10 may have a predefined operating range of temperatures within which the batteries 904 should operate. If the current temperature of the batteries 904 is below a bottom threshold or range of the operating range of temperatures, the battery TMS 908 may provide heating to the batteries 904 (e.g., in a closed-loop manner based on battery temperature as measured by a battery sensor 926) to drive the temperature of the batteries 904 to be within the operating range of temperatures. Similarly, if the current temperature of the batteries 904 is greater than an upper threshold or range of the operating range of temperatures, the battery TMS 908 may provide cooling to the batteries 904 to drive the temperature of the batteries 904 to be within the operating range of temperatures and thereby reduce overheat of the batteries 904. The battery TMS 908 may induce forced convective heating or cooling at the batteries 904.

The vehicle system(s) 918 can include any chassis or body systems of the vehicle 10. For example, the vehicle systems(s) 918 may include hydraulic systems, air compressed systems, water jet systems, lift apparatuses, reach apparatuses, refuse compaction apparatuses, etc. In some embodiments, the various system(s) 918 of the vehicle 10 are each controlled by a lower-level controller or processing circuitry. The controller 902 may generate controls for the vehicle system(s) 918 or components thereof, or may activate any of the lower-level controllers so that the lower-level controllers operate the components of the vehicle system(s) 918 according to their control strategies.

The sensors 924 of the control system 900 of the vehicle 10 can be any temperature sensors (e.g., environmental temperature sensors, temperature sensors within the cab 40, battery temperature sensors, etc.), humidity sensors, current or voltage sensors (e.g., current drawn by the batteries 904 while charging, current or power drawn by various electrical components of the vehicle 10, etc.), speed sensors (e.g., sensors configured to measure revolutions per minute "RPM" or angular speed of a motor), orientation sensors (e.g., sensors that measure yaw, pitch, etc., of the vehicle 10), state of health (SOH) sensors (e.g., sensors that measure an SOH of the batteries 904, or measure a property of the batteries 904 that is related to SOH), state of charge (SOC) sensors (e.g., sensors that measure an SOC of the batteries 904), etc. The controller 902 may generally be configured to obtain any sensor data obtained from any sensors of the vehicle 10. In particular, the controller 902 may communicate on the CAN bus of the vehicle 10 and obtain any sensor information, system information, etc., from sensors, systems, sub-systems, components, etc., of the vehicle 10.

The battery charging system 906 is removably electrically coupled with the batteries 904 through a DC-DC connection. The battery charging system 906 can be configured to provide a variable rate of charge (e.g., adjust charging power provided to the batteries 904, adjust an amperage of charging power provided to the batteries 904, etc.) in response to control signals provided by the controller 902. In some embodiments, the battery charging system 906 is also configured to provide sensor feedback to the controller 902 indicating various electrical parameters of the battery charging system 906 as the batteries 904 are charged. In some embodiments, the battery sensors 926 are also configured to provide battery data (e.g., data indicating an SOH and/or SOC of the batteries 904 or of particular battery cells of the batteries 904).

The battery charging system 906 can be configured to operate between different modes to provide different rates of charging for the batteries 904. In some embodiments, the rate of charging of the batteries 904 as provided by the battery charging system 906 is infinitely variable. In some embodiments, the controller 902 is configured to transition the battery charging system 906 between the different modes or at the different charging rates based on a current time relative to the deployment time $t_{deploy}$. The controller 902 may also operate the hydraulic heater circuit 920, the HVAC system 912, the battery TMS 908, etc., in order to pre-condition the vehicle 10 prior to the deployment time $t_{deploy}$.

Variable Charging Rate

Figure 10:
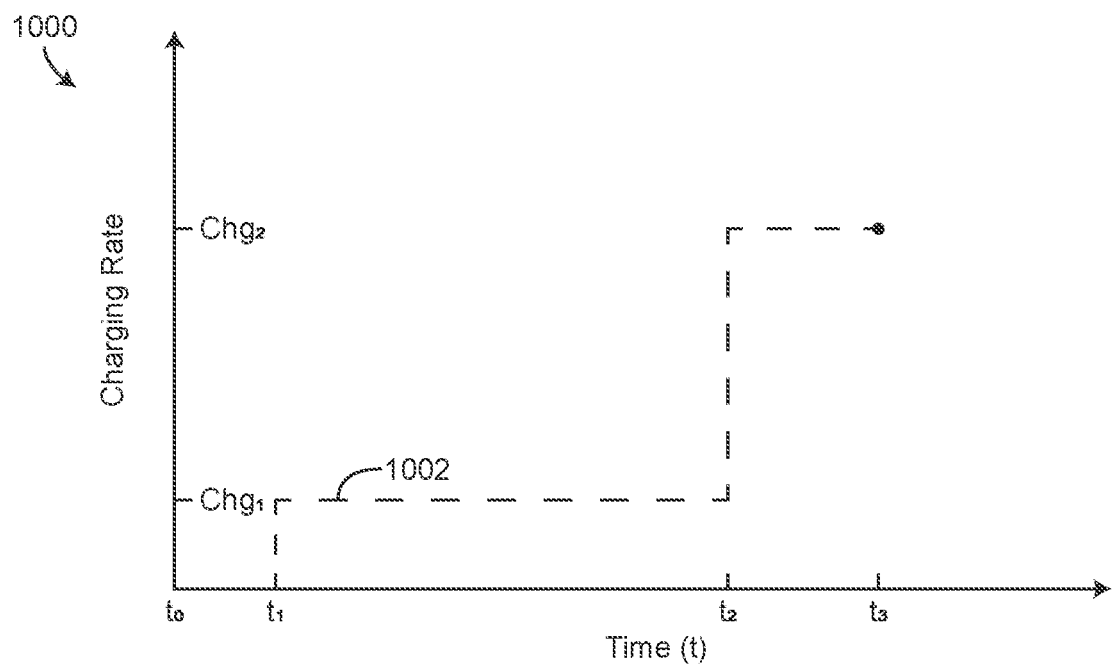
FIG. 10 is a graph showing two different charging rates and two different time periods for pre-conditioning a vehicle by charging batteries prior to a scheduled deployment time, according to an exemplary embodiment.

Referring to FIG. 10, a graph 1000 illustrates charging rate provided to the batteries 904 by the battery charging system 906 over time (illustrated by series 1002), according to some embodiments. The graph 1000 illustrates how the controller 902 may operate the battery charging system 906 based on a deployment time $t_{deploy}$ at time $t_3$. The controller 902 may obtain the deployment time $t_{deploy}$ from the telematics system 910 as provided by a fleet manager. The deployment time $t_{deploy}$ indicates a time at which the vehicle 10 should be prepared or ready for deployment. In some embodiments, the controller 902 is configured to prepare or pre-condition the vehicle 10 for deployment at the deployment time $t_{deploy}$ or at a time slightly before (e.g., 10 minutes prior to) the deployment time $t_{deploy}$.

The controller 902 may determine a first time interval $t_1$ to $t_2$ and a second time interval $t_2$ to $t_3$ and associated charging rates for each of the first time interval and the second time interval. Specifically, the controller 902 is configured to determine a first charging rate $Chg_1$ and a second charging rate $Chg_2$ for the battery charging system 906 to operate at over the first time interval and the second time interval, respectively.

In some embodiments, the controller 902 determines the first time interval, the second time interval, and the associated charging rates based on an amount of time between the deployment time at time $t_3$ and a time at which the battery charging system 906 is electrically coupled with the batteries 904, at time $t_1$. For example, if the battery charging system 906 is electrically coupled with the batteries 904 at a time shortly before the deployment time $t_3$, the controller 902 may determine that the first time interval should have a minimal or zero duration, and may determine that the charging rate for the second time interval should be significantly higher in order to fully charge the batteries 904 of the vehicle 10 by the deployment time at time $t_3$.

In some embodiments, the controller 902 is configured to obtain, from the battery sensor 926, or from the battery charging system 906, battery data that indicates an initial SOC of the batteries 904 $SOC_i$ at the time $t_1$ when the battery charging system 906 is coupled with the batteries 904. The controller 902 can compare the initial SOC, $SOC_i$ to a fully charged SOC, $SOC_f$ to determine a quantity of electrical energy that is required by the batteries 904 to achieve the fully charged SOC, $SOC_f$. The controller 902 can use the difference between the initial SOC, $SOC_i$, and the fully charged SOC, $SOC_f$ (e.g., $\Delta SOC = SOC_f - SOC_i$) to determine the charging rates $Chg_1$ and $Chg_2$ and the time intervals for charging the batteries 904 to achieve the fully charged SOC, $SOC_f$ by the deployment time at $t_3$.

In some embodiments, the controller 902 is also configured to use or determine an SOH of the batteries 904, in combination with the required amount of energy that the batteries 904 require to achieve the fully charged SOC, $SOC_f$, to determine the charging rates $Chg_1$ and $Chg_2$ and to determine the time intervals between $t_1$ and $t_2$, and between $t_2$ and $t_3$. For example, the SOH of the batteries 904 may related to a loss of power or a decreased efficiency in charging of the batteries 904. If the SOH is low, the batteries 904 may require a longer charging time, higher charging rates, etc. Similarly, if the SOH of the batteries 904 is high, the batteries 904 may not require any additional compensation in charging to account for the SOH of the batteries 904. In this way, the controller 902 can compensate for inefficiencies in the charging of the batteries 904 due to the SOH of the batteries 904.

As shown in FIG. 10, the charging rate of the batteries 904 over the first time interval between the first time $t_1$ and the second time $t_2$, $Chg_1$ is lower than the charging rate of the batteries 904 over the second time interval between the second time $t_2$ and the third time $t_3$, $Chg_2$. The controller 902 can provide the time intervals and the corresponding charging rates to the battery charging system 906 for use in charging the batteries 904. In some embodiments, the controller 902 operates the battery charging system 906 to charge the batteries 904 of the vehicle 10 according to the charging rates and the time intervals as shown in FIG. 10. In some embodiments, the first time interval is significantly longer than the second time interval and has a significantly lower charging rate (e.g., less than half the charging rate of the second time interval). In this way, the batteries 904 may be initially charged over the first time interval at a low charging rate (e.g., a trickle charge) and then be charged over the second time interval at a higher charging rate (e.g., a higher charge) to prepare the batteries 904 for deployment. In some embodiments, charging the batteries 904 at a high rate for a prolonged period of time may disadvantageously affect the SOH of the batteries 904. Accordingly, the controller 902 advantageously charges the batteries 904 at a lower rate over a longer time interval, and then at a higher rate over a shorter time interval to prolong battery life or improve SOH of the batteries 904 over time. It should be understood that while FIG. 10 shows the charging rate immediately changing from $Chg_1$ to $Chg_2$ at time $t_2$, the transition between the charging rates may be a ramped transition. In some embodiments, the second time interval from $t_2$ to $t_3$ is a "top-off" time interval with the increased charging rate $Chg_2$ immediately before the scheduled deployment time to minimize time spent at the increased or higher charging rate $Chg_2$. In some embodiments, if the charging system 906 provides a 0 Amp current to the batteries 904, this may cause a fault, and clearance of the fault may require electrically decoupling the battery charging system 906 from the batteries 904 and electrically re-coupling the battery charging system 906 with the batteries 904. Continuously providing a trickle charge, or a near zero charge rate (e.g., $Chg_1$) advantageously reduces a likelihood of a fault occurring which would require unplugging and re-coupling the battery charging system 906 with the batteries 904. In some embodiments, the battery charging system 906 always provides at least a small amount of charging power, even when the batteries 904 are fully charged.

In some embodiments, the controller 902 is configured to obtain historical charging data (e.g., in the telematics data provided by the vehicle telematics system 910) from the remote system 914 and/or the vehicle telematics system 910. In some embodiments, the controller 902 is configured to store the historical charging data in memory thereof. In some embodiments, the historical charging data may indicate an amount of time that was required over previous charges in order to achieve a full SOC at the batteries 904. In some embodiments, the historical charging data may indicate a SOH of the batteries 904 as determined over or detected at previous charges of the batteries 904. For example, the historical charging data may include multiple datasets, with each dataset indicating the SOH of the batteries 904 over the previous charges, and the time intervals and charging rates of the previous charges. In some embodiments, the controller 902 is configured to perform a regression to generate a model that predicts an amount of time required for charging the batteries 904 as a function of SOH of the batteries 904 based on the historical charging data. In some embodiments, the controller 902 is configured to perform a regression to generate a model that predicts an SOH of the batteries based on a number of charges and the changes of the SOH (e.g., degradation of the batteries 904 with respect to total number of charges of the batteries 904). In some embodiments, the controller 902 is configured to use the historical data or determined data thereof, in combination with the SOH of the batteries 904 to determine the charging rates and the time intervals for the batteries 904.

Figure 11:
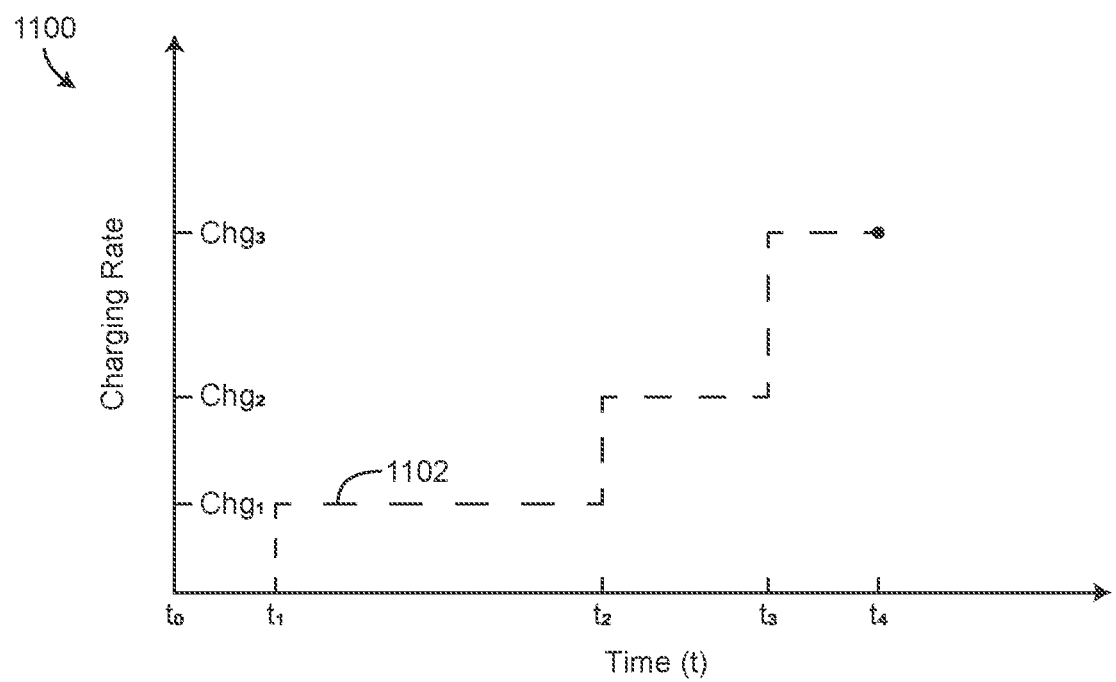
FIG. 11 is a graph showing three different charging rates and three different time periods for pre-conditioning a vehicle by charging batteries prior to a scheduled deployment time, according to an exemplary embodiment.

Referring to FIG. 11, a graph 1100 shows another embodiment or potential charging strategy of the control system 900 that includes three time intervals. The charging strategy shown in FIG. 11 includes a first charge rate $Chg_1$ over a first time interval from times $t_1$ to $t_2$, a second charge rate $Chg_2$ over a second time interval from times $t_2$ to $t_3$, and a third charge rate $Chg_3$ from times $t_3$ to $t_4$. The first charge rate $Chg_1$ is less than the second charge rate $Chg_2$, which is less than the third charge rate $Chg_3$. Similarly, the first time interval is longer than the second time interval, which is longer than the third time interval. In some embodiments, the time intervals and the charging rates of the embodiment shown in FIG. 11 are determined by the controller 902 similarly to the time intervals and charging rates of the embodiment shown in FIG. 10 as described in greater detail above with reference to FIG. 10. The deployment time in the embodiment shown in FIG. 11 is at the time $t_4$ or shortly after. In this way, the controller 902 can determine any number of time intervals and corresponding charging rates to achieve a full SOC of the batteries 904 by the deployment time, while accounting for the particular SOH of the batteries 904 (or using historical data over previous charges of the batteries 904). Advantageously, high charging rates may be delayed until necessary, over a time interval before the deployment time to prolong life of the batteries 904.

Thermal Pre-Conditioning

Figure 12:
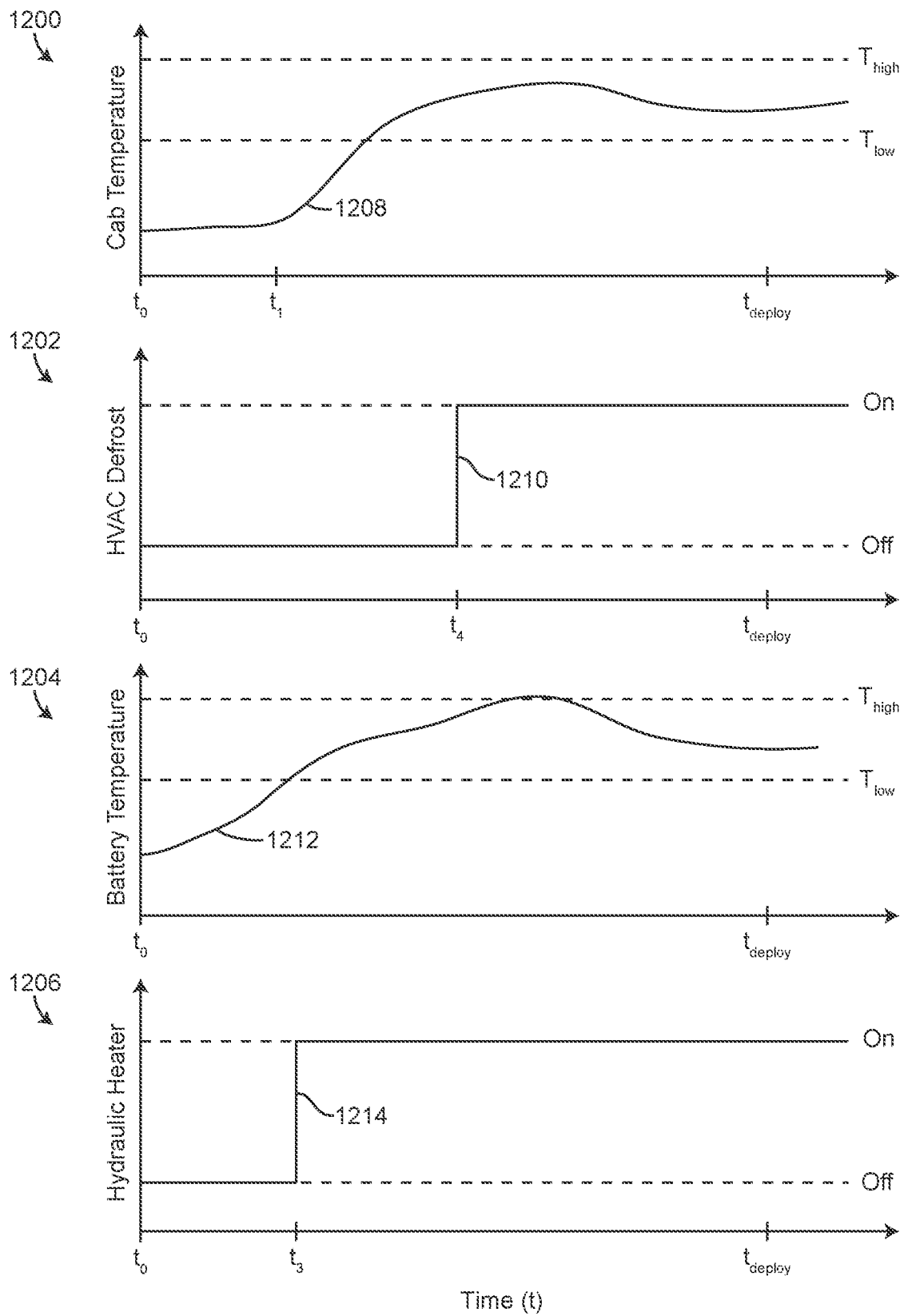
FIG. 12 is a set of graphs illustrating different pre-conditioning operations including cab temperature control, windshield defrost, battery temperature regulation, and hydraulic heating of a vehicle, prior to a scheduled deployment time, according to an exemplary embodiment.

Referring to FIG. 12, graphs 1200-1206 illustrate different pre-conditioning operations after the vehicle 10 has been electrically coupled with the battery charging system 906. Graph 1200 illustrates temperature within the cab 40 over time when the cab 40 is heated by the HVAC system 912. Graph 1202 illustrates a status of a defrost operation of the HVAC system 912 over time. Graph 1204 illustrates a temperature of the batteries 904 over time as the battery TMS 908 operates to heat or cool the batteries 904 prior to deployment of the vehicle 10. Graph 1206 illustrates a status of the hydraulic heater circuit 920 over time prior to deployment of the vehicle 10.

As shown in graph 1200, a series 1208 illustrates temperature of the cab 40 over time. At time $t_0$ the vehicle 10 is electrically coupled with the battery charging system 906 and thereby regulated mainline power can be drawn by the HVAC system 912. Graph 1200 includes a high temperature threshold $T_{high}$ and a low temperature threshold $T_{low}$. The high and low temperature thresholds define an acceptable range for the temperature of the cab 40, within which the temperature of the cab 40 should be prior to deployment time $t_{deploy}$. In some embodiments, the temperature thresholds $T_{high}$ and $T_{low}$ are defined by a user or occupant of the cab 40 or by a fleet manager. The controller 902 may determine an estimated amount of time required to heat or cool the cab 40 to be within the temperature thresholds using a thermal model of the cab 40 and a measured temperature of the cab 40. In some embodiments, the controller 902 uses the estimated amount of time required to heat or cool the cab 40 and the deployment time $t_{deploy}$ to determine when to initiate the heating or cooling (i.e., to determine the time $t_1$). The controller 902 may initiate the heating or cooling for the cab 40 at the time $t_1$. In some embodiments, the controller 902 performs a closed-loop feedback control (e.g., On/Off control, PID control, etc.) to determine control decisions for components of the HVAC system 912. The controller 902 can obtain current temperature readings of the cab 40 and adjust operation of the HVAC system 912 to drive the temperature of the cab 40 to be within the range defined by the temperature thresholds, and to maintain the temperature of the cab 40 within the temperature thresholds until the deployment time $t_{deploy}$.

As shown in graph 1202, a series 1210 illustrates a state of a defrost function of the HVAC system 912 over time. The defrost function of the HVAC system 912 may be a redirection of some air onto a windshield or window of the cab 40. The defrost function of the HVAC system 912 may be transitionable between an on state (where air is directed towards the windshield) and an off state (where air is not directed to the windshield) as shown in series 1210. In some embodiments, a rate at which air is delivered to the windshield of the cab 40 is independently adjustable. In some embodiments, activation of the defrost function of the HVAC system 912 results in a re-direction or a portion of the air that is provided to the cab 40 to be provided to the windshield. In some embodiments, the controller 902 is configured to determine if defrost of the windshield is necessary (e.g., based on windshield sensors that detect the presence of frost, based on optical sensors that detect the presence of frost, if an environmental temperature at the vehicle 10 is below or at freezing temperature, etc.). If defrost of the windshield is necessary, the controller 902 can determine an amount of time required to defrost the windshield. In some embodiments, the amount of time is a predetermined amount of time. The controller 902 determines an activation time, shown as $t_4$ based on the scheduled deployment time $t_{deploy}$ and the amount of time required to defrost the windshield. When the activation time $t_4$ arrives, the controller 902 activates the defrost function of the HVAC system 912 so that the windshield is completely defrosted by the deployment time $t_{deploy}$.

As shown in graph 1204, a series 1212 illustrates a temperature of the batteries 904 over time. The battery temperature as shown in graph 1204 can be controlled through operation of the battery TMS 908 which may provide heating or cooling to the batteries 904. The graph 1204 is shown to include a high temperature threshold $T_{high}$ and a low temperature threshold $T_{low}$. The high temperature threshold and the low temperature threshold for the batteries 904 may be different than the high temperature threshold and the low temperature threshold of the cab 40 as shown in graph 1202. The controller 902 is configured to operate the battery TMS 908 so that the temperature at the batteries 904 is maintained within the temperature thresholds while charging. If the temperature at the batteries 904 is initially lower than the low temperature threshold, the controller 902 initially operates the battery TMS 908 to provide heat to the batteries 904. Likewise, if the temperature at the batteries 904 is initially higher than the high temperature threshold, the controller 902 may initially operate the battery TMS 908 to provide cooling to the batteries 904. The controller 902 may initiate the battery TMS 908 as soon as the battery charging system 906 is electrically coupled with the vehicle 10 (e.g., to provide DC-DC charging power to the batteries 904, and to provide regulated mainline power to the battery TMS 908, the HVAC system 912, the hydraulic heater circuit 920, etc.). In some embodiments, the controller 902 initiates the battery TMS 908 at a time after the battery charging system 906 is electrically coupled with the vehicle 10.

In some embodiments, the controller 902 is configured to operate the battery TMS 908 based on a currently measured temperature of the batteries 904, the temperature thresholds, and a thermal model of the batteries 904, or a space within which the batteries 904 are positioned. The thermal model of the batteries 904 may predict a temperature of the batteries 904 at a future time as a function of environmental temperature, an amount of heating or cooling provided by the battery TMS 908, a charging rate of the batteries 904, a current or initial temperature of the batteries 904, and time. In some embodiments, the thermal model is specific to the batteries 904 (e.g., a number, size, rating, type, a current SOH, a current SOC, etc.). For example, some types of batteries may give off more heat than other types of batteries. In some embodiments, the thermal model includes a term that models heat disturbance due to heat emissions by the batteries 904 as a function of charging rate of the batteries 904.

As shown in graph 1204 of FIG. 12, the temperature of the batteries 904 exceeds the high temperature threshold $T_{high}$. At this point, the controller 902 may shut-off heating provided by the battery TMS 908, or even initiate cooling of the batteries 904 if the temperature continues rising. The controller 902 can operate the battery TMS 908 using the thermal model in a feedforward control manner to account for thermal latency of internal cell heat flux of the batteries 904 based on real-time or current power demands of the batteries 904. The controller 902 may implement a closed-loop control strategy (e.g., on/off, PID control, etc.) based on current temperature of the batteries 904 and the high and low temperature thresholds as shown in graph 1204 of FIG. 12.

As shown in graph 1206 of FIG. 12, the status of the hydraulic heater circuit 920, can be transitioned between an on-state in which heating is provided to the hydraulics 922 or hydraulic fluid of the vehicle 10, and an off-state in which heating is not provided to the hydraulics 922 or hydraulic fluid of the vehicle 10 (illustrated by series 1214). In some embodiments, the controller 902 is configured to determine a time $t_3$ at which to activate the hydraulic heater circuit 920 so that the temperature of the hydraulic fluid is at a desired value by the deployment time $t_{deploy}$. In some embodiments, the time $t_3$ is determined by the controller 902 based on an amount of time required to heat the hydraulics and based on the deployment time $t_{deploy}$. The controller 902 activates the hydraulic heater circuit 920 at the time $t_3$.

Controller Diagram

Referring to FIG. 9B, the controller 902 is shown in greater detail, according to some embodiments. The controller 902 includes processing circuitry 925 including a processor 927 and memory 928. Processing circuitry 925 can be communicably connected with a communications interface of controller 902 such that processing circuitry 925 and the various components thereof can send and receive data via the communications interface. Processor 927 can be implemented as a general purpose processor, an application specific integrated circuit (ASIC), one or more field programmable gate arrays (FPGAs), a group of processing components, or other suitable electronic processing components.

Memory 928 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 928 can be or include volatile memory or non-volatile memory. Memory 928 can include database components, object code components, script components, or any other type of information structure for supporting the various activities and information structures described in the present application. According to some embodiments, memory 928 is communicably connected to processor 927 via processing circuitry 925 and includes computer code for executing (e.g., by processing circuitry 925 and/or processor 927) one or more processes described herein.

The memory 928 includes an HVAC manager 932, a hydraulic manager 934, a historical charging database (DB) 948, a systems manager 936, a charging manager 938, a learning manager 940, a battery TMS manager 942, a balancing manager 944, and a network manager 946. One or more of the managers 932-946 are configured to control a corresponding portion or system of the vehicle 10. For example, the HVAC manager 932 may operate the HVAC system 912 to provide heating or cooling to the cab 40, the hydraulic manager 934 may be configured to activate or deactivate the hydraulic heater circuit 920. Likewise, the systems manager 936 can control operations of the vehicle systems 918, the charging manager 938 can control operations of the battery charging system 906, the battery TMS manager 942 can control operations of the battery TMS 908. The network manager 946 can control operation of the vehicle telematics system 910. The balancing manager 944 can be configured to operate the batteries 904 to provide load balancing between the different batteries 904.

The HVAC manager 932 can be configured to operate the HVAC system 912, according to some embodiments. The HVAC manager 932 may be configured to operate the HVAC system 912 using a closed-loop control strategy based on feedback from a temperature sensor (e.g., a temperature sensor of sensors 924 that is positioned within the cab 40, and/or a temperature sensor of sensors 924 that is positioned in an environment surrounding the cab 40), and based on high and low temperature thresholds. The HVAC manager 932 may operate the HVAC system 912 (e.g., by generating HVAC controls and providing the HVAC controls to the HVAC system 912) to maintain the temperature within the cab 40 between the high and low temperature thresholds.

In some embodiments, the HVAC manager 932 is configured to use a thermal model and a scheduled start or deployment time of the vehicle 10 to determine when to initiate the heating or cooling of the cab 40, and to determine how rapidly to heat or cool the cab 40 over time. In some embodiments, the thermal model is configured to predict a temperature of the cab 40 at a future time, and the future time at which the cab 40 will achieve the predicted temperature, based on current environmental temperatures and based on control decisions of the HVAC system 912 (e.g., based on an amount or rate of heating or cooling that is provided to the cab 40). The thermal model can be a predetermined model that is determined based on known characteristics of the cab 40 (e.g., the space, the amount of heat capacitance, etc.), and/or may be calibrated based on historical data regarding the cab 40 (e.g., an amount of time it previously took to heat the cab 40 to the desired temperature from an initial temperature, etc.).

The hydraulic manager 934 is configured to determine hydraulic heater controls for the hydraulic heater circuit 920, according to some embodiments. In some embodiments, the hydraulic manager 934 is configured to determine when to activate the hydraulic heater circuit 920. In some embodiments, the hydraulic heater circuit 920 is transitionable between an activated state (where heat is provided to the hydraulics 922 of the vehicle 10), and a deactivated state (where heat is not provided to the hydraulics 922 of the vehicle 10). In some embodiments, the hydraulic manager 934 is configured to determine whether to activate the hydraulic heater circuit 920 (e.g., based on environmental temperature as obtained from one of the sensors 924), and when to activate the hydraulic heater circuit 920. In some embodiments, if the environmental temperature is greater than a threshold, the hydraulic manager 934 is configured to determine that the hydraulic heater circuit 920 should be activated and that the hydraulics 922 should be pre-conditioned by preheating the hydraulics 922 (e.g., using resistive heating, forced convective heating, a hydraulic based heating loop that heats via inefficient use of oil flow, etc.).

The hydraulic manager 934 can use the environmental temperature and a desired or target temperature to determine an amount of time required to heat the hydraulics 922 to the desired temperature. In some embodiments, the hydraulic manager 934 is configured to determine, based on the amount of time required to heat the hydraulics 922, and the scheduled deployment time of the vehicle 10, when to activate the hydraulic heater circuit 920 so that the hydraulics are at the desired or target temperature by the scheduled deployment time. In some embodiments, the hydraulic manager 934 is configured to determine the amount of time required to heat the hydraulics 922 based on historical data indicating an amount of time previously required for similar environmental conditions to heat the hydraulics 922. The hydraulic manager 934 can use historical data of (1) environmental temperature (or hydraulic temperature), and (2) amount of time required to heat the hydraulics 922 to the desired or target temperature for the associated environmental temperature to perform a regression to generate a model that predicts an amount of time required to heat the hydraulics 922 given a particular environmental temperature. The hydraulic manager 934 can use this model to determine, based on current or initial environmental temperature (or current or initial temperature at the hydraulics 922), an amount of time required to heat the hydraulics 922 to achieve the desired or target temperature. The hydraulic manager 934 can determine, based on the amount of time required to heat the hydraulics 922, and the scheduled deployment time of the vehicle 10, when to initiate the hydraulic heater circuit 920 to achieve the desired or target temperature at the hydraulics 922.

The systems manager 936 is configured to operate any of the vehicle system(s) 918. In some embodiments, the systems manager 936 is configured to generate control signals for the vehicle systems 918 to operate the vehicle systems 918 according to one or more user inputs, or according to automatic operations. For example, the systems manager 936 may receive a user input from a human machine interface (HMI). The user input may be a selection or a command to operate one of the vehicle systems 918 according to a desired action. For example, the vehicle systems 918 can be any controllable elements or systems (e.g., chassis or body) of the vehicle 10, the refuse truck 100, the mixer truck 200, the fire fighting vehicle 300, the ARFF truck 400, the boom lift 500, or the scissor lift 600.

The charging manager 938 is configured to generate charging controls for the battery charging system 906 so that the batteries 904 (e.g., HV batteries 904) are sufficiently or fully charged by the scheduled deployment time for the vehicle 10, according to some embodiments. In some embodiments, the charging manager 938 is configured to obtain, through measurements, and/or historical data, a current SOH of the batteries 904 and a current SOC of the batteries 904. The charging manager 938 can be configured to determine any number of charging intervals and corresponding charge rates for the batteries 904 as described in greater detail above with reference to FIGS. 10-11. In some embodiments, the charging manager 938 is configured to estimate charging losses or additional charging time that is required to account for the current SOH of the batteries 904. In some embodiments, the charging manager 938 is configured to operate the battery charging system 906 so that the battery charging system 906 provides DC charging power to the batteries 904 according to the charging rates across the multiple charging time intervals. In some embodiments, the charging manager 938 uses a model that is based on historical data of previous charges of the batteries 904 as provided by the historical charging DB 948, and/or based on historical data provided by the remote system 914 via the vehicle telematics system 910 and the network manager 946. In some embodiments, the charging manager 938 minimizes time spent at low levels of charge voltage using derate controls that are below set levels of a SOC (e.g., a % SOC) of the batteries 904. In some embodiments, the charging manager 938 is configured to use a minimum cell voltage and a minimum sub-pack voltage as trigger points to enable or disable charging to mitigate over voltage and under voltage stress conditions of the batteries 904.

In some embodiments, the charging manager 938 is also a discharge manager that controls discharge of the batteries 904 (e.g., so that the vehicle systems 918 can consume power from the batteries 904). In some embodiments, the charging manager 938 is configured to monitor minimum and maximum cell voltage measurements as provided by battery sensor(s) 926, and minimum and maximum sub-pack voltage measurements, and use the cell voltage measurements or the sub-pack voltage measurements as triggers for derating power (e.g., to derate the in-flow of power to the batteries 904 from the battery charging system 906 or to derate out-flow of power from the batteries 904 to the vehicle system(s) 918, the vehicle telematics system 910, the HVAC system 912, the hydraulic heater circuit 920, the hydraulics 922, the battery TMS 908, etc.). In some embodiments, derating the power in-flow or out-flow facilitates mitigating over voltage and under voltage stress conditions at the batteries 904.

In some embodiments, the battery sensor 926 includes one or more string current sensors that is/are configured to measure or receive string current feedback from the batteries 904 or cells or sub-packs thereof. In some embodiments, the charging manager 938 is configured to reduce a current provided to or discharged by the batteries 904 (e.g., derate power in-flow or out-flow of the batteries 904) in response to a 10% or greater difference between current string to string current at the batteries 904 (e.g., between different cells or sub-packs of the batteries 904). In some embodiments, a value other than 10% is used (e.g., some threshold), and if two cells or sub-packs have string to string current that differs by at least the threshold amount or percent, the charging manager 938 is configured to adjust the current into out of the batteries 904, or cells or sub-packs thereof. In some embodiments, the charging manager 938 is configured to derate power or current discharged by the batteries 904 or provided to the batteries 904 based on a 250 Amp per string continuous physical layer that provides limitations to mitigate electrode gradient stresses.

In some embodiments, the systems manager 936 and the charging manager 938 are configured to cooperatively operate to leverage auxiliary loads in order to mitigate or reduce a likelihood of transient overvoltage conditions. For example, if an overvoltage condition occurs at the batteries 904 during operation of the vehicle 10, the systems manager 936 and the charging manager 938 may activate one or more auxiliary loads (e.g., the hydraulic heater circuit 920, any of the vehicle systems 918, the HVAC system 912, the battery TMS 908, etc.) in order to cause a drop in the voltage at the batteries 904 to thereby mitigate overvoltage conditions. In some embodiments, activating the one or more auxiliary loads can include turning on heaters of the vehicle 10 or vehicle systems 918, commanding 16 VDC from the DC-DC charging power, commanding compressors to run, etc., to reduce voltage at the batteries 904.

The learning manager 940 is configured to obtain historical data of previously performed pre-conditioning operations of the vehicle 10, according to some embodiments. In some embodiments, the learning manager 940 is configured to obtain the historical data from the historical charging DB 948, and/or from the vehicle telematics system 910 (e.g., from the remote system 914). In some embodiments, the learning manager 940 is configured to use the historical data and a regression technique to generate predictive models for the hydraulic manager 934, the HVAC manager 932, the charging manager 938, or the battery TMS manager 942. In some embodiments, the learning manager 940 is configured to adjust a parameter of any of the models of the hydraulic manager 934, the HVAC manager 932, the charging manager 938, or the battery TMS manager 942.

Figure 16:
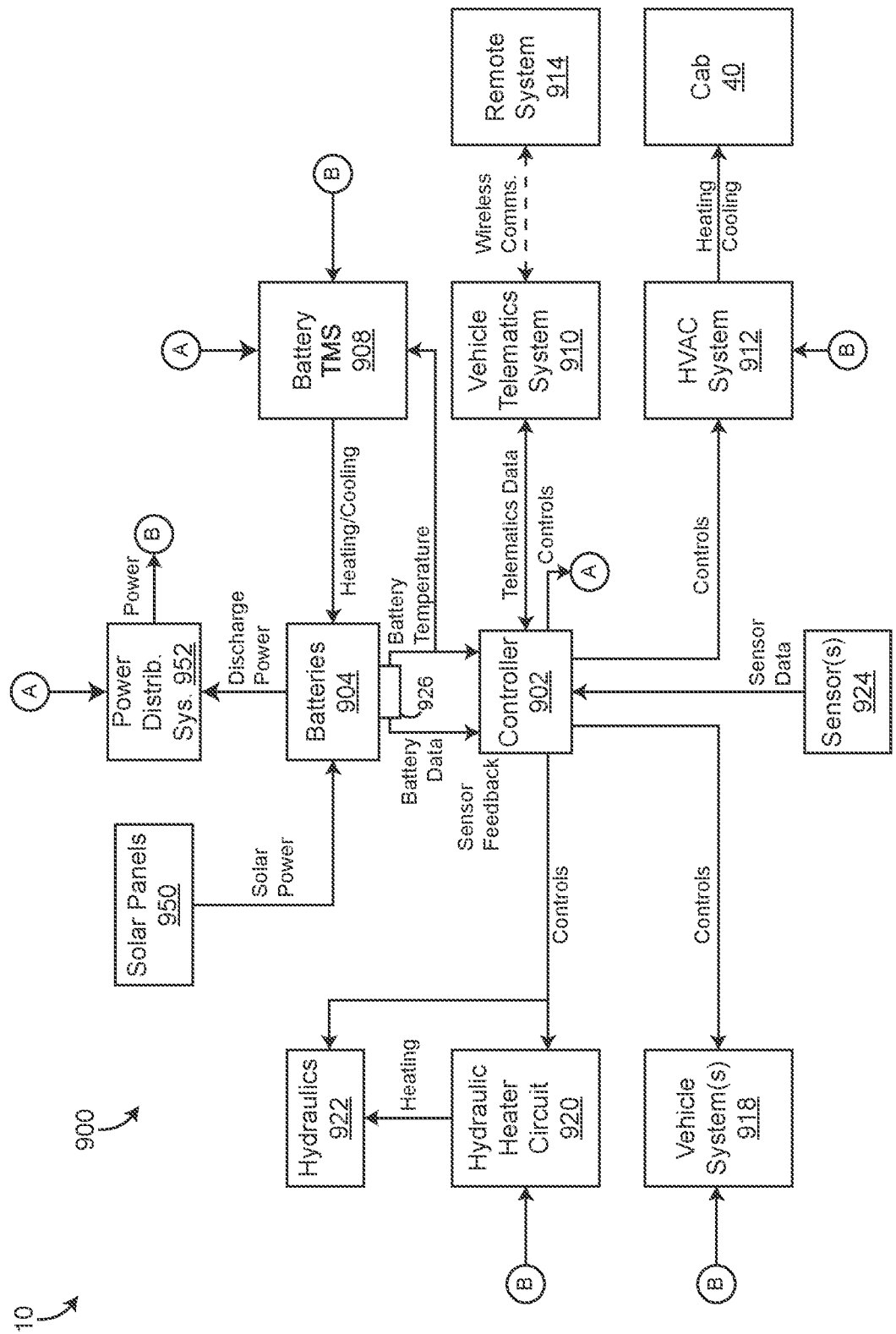
FIG. 16 is a block diagram of the control system of FIG. 9A when a charging system is disconnected and batteries provide power to electrical systems of the control system, according to an exemplary embodiment.

When the vehicle 10 operates after deployment and the control system 900 operates to discharge power from the batteries 904 to the electrical systems (e.g., the vehicle systems 918, etc., as shown in FIG. 16), the learning manager 940 can obtain information regarding each of the electrical loads drawn from the batteries 904 (e.g., the amount of power consumed by each of the vehicle systems 918), times at which the different vehicle systems 918 are used, a current GPS location of the vehicle 10 along a route (e.g., as provided by the vehicle telematics system 910), a route that the vehicle 10 is travelling along, different elevations along the route of the vehicle 10, an outdoor temperature or climate (e.g., as detected by the sensors 924), etc. In some embodiments, the learning manager 940 is configured to identify various conditions where electrical consumption of the vehicle systems 918 can be reduced based on identified patterns of usage of the vehicle systems 918 at different GPS locations along the route, the route itself, the route elevation, and outdoor climate. The learning manager 940 can provide suggestions to the systems manager 936 of when to reduce electrical consumption of the vehicle systems 918, according to some embodiments. The systems manager 936 can use the suggestions provided by the learning manager 940 to reduce electrical consumption of the vehicle systems 918 (and/or the HVAC system 912, the battery TMS 908, the hydraulic heater circuit 920, etc.).

In some embodiments, the learning manager 940 is configured to use battery events (e.g., as indicated by the battery data) to determine aging or degradation of the batteries 904 (e.g., a current SOH, a degradation rate, etc.), and/or a trend of the aging or degradation of the batteries 904. In some embodiments, the battery data provided to the learning manager 940 includes minimum and maximum cell temperatures of the batteries 904, voltage current, minimum and maximum system temperature voltage current, total Amp-hours into or out of the batteries 904, total power in or out of the batteries 904 (e.g., kWh), a maximum change in SOC of the batteries (e.g., a change in SOC greater than a threshold may indicate that the SOH of the batteries 904 is deteriorating), a maximum change in SOH of the batteries (e.g., a change in SOH greater than a threshold may indicate that the batteries 904 are rapidly degrading), a maximum change in cell voltage between time steps (e.g., abrupt changes may indicate poor health of the batteries 904), a maximum change in cell temperature of the batteries 904 between time steps, a change in SOC per a change in time at a constant current of charge or discharge of the batteries 904, etc. The learning manager 940 may use these to identify a health or degradation state of the batteries 904, and/or to determine a trend of the health or degradation state of the batteries 904. The learning manager 940 may use a neural network to predict the health or degradation state of the batteries 904 or the trend of the health or degradation state of the batteries 904. In some embodiments, the learning manager 940 is configured to use a neural network generated model to predict a failure time of the batteries 904 or to predict when the batteries 904 should be replaced with new batteries. Such failure time or predicted replacement time can be provided to a fleet manager, or the remote system 914 via the vehicle telematics system 910.

The battery TMS manager 942 is configured to determine TMS controls for the battery TMS 908 based on a current temperature at the batteries 904, a high temperature threshold, a low temperature threshold, and charging decisions of the batteries 904, according to some embodiments. In some embodiments, the battery TMS manager 942 is configured to determine if a current temperature at the batteries is within the high temperature threshold and the low temperature threshold (e.g., if the current temperature is less than the high temperature threshold and greater than the low temperature threshold). If the current temperature at the batteries is within the high temperature threshold and the low temperature threshold, the battery TMS manager 942 may determine that heating or cooling is not required. If the current temperature at the batteries is above the high temperature threshold, the battery TMS manager 942 may determine that cooling is required to drive the temperature at the batteries to be within the range specified by the high temperature threshold and the low temperature threshold. Similarly, if the current temperature at the batteries is below the low temperature threshold, the battery TMS manager 942 may determine that heating is required to drive the temperature at the batteries to be within the range specified by the high temperature threshold and the low temperature threshold.

The battery TMS manager 942 can be configured to use a predictive model that estimates heat produced as a function of the charging of the batteries 904. For example, charging the batteries 904, especially at high rates of charge, may produce heat in a space within which the batteries 904 are positioned, and therefore less heating (or even cooling) may be required by the battery TMS 908. In some embodiments, the battery TMS manager 942 is configured to determine a degree of heating or cooling that is required to maintain the batteries 904 over pre-conditioning time periods (e.g., as the batteries 904 are charged) while accounting for heat generation at the batteries 904 due to charging the batteries 904. In some embodiments, the battery TMS manager 942 is configured to perform any of the techniques of the controller 902 as described in greater detail above with reference to FIG. 12. In some embodiments, the battery TMS manager 942 is configured to minimize time spent at an elevated or cold temperature (e.g., above or below the high and low temperature thresholds respectively) based on an average cell temperature measured at the batteries 904 (and/or based on a maximum or minimum temperature measured at the batteries 904 as measured). In some embodiments, the battery TMS manager 942 is configured to use the predictive model to perform a thermal model based control while accounting for thermal latency of internal cell heat flux of the batteries 904.

In some embodiments, the thermal model based control reduces a likelihood of the batteries 904 reaching an undesired temperature (e.g., too high or too low) using feedforward cooling demands that are based on real-time power or current demands of the batteries 904 (e.g., based on a rate at which electricity is entering or leaving the batteries 904). In some embodiments, the battery TMS manager 942 is configured to use any of the techniques described herein to heat or cool the batteries 904 while the batteries 904 are charging (e.g., during pre-conditioning operations) or even when the batteries 904 are discharging energy to various systems (e.g., the vehicle systems 918) to maintain the batteries 904 at a desired temperature. In some embodiments, the battery TMS manager 942 is configured to use a current required power discharge from the batteries 904 to determine how to heat or cool the batteries 904 to maintain the batteries 904 within the high and low temperature thresholds while accounting for heat generated due to discharging power from the batteries 904 to the vehicle systems 918. The battery TMS manager 942 thereby operates to minimize an amount of time that the batteries 904 are at an elevated temperature (e.g., minimize an amount of time that the batteries 904 are at a temperature greater than the high temperature threshold), or to minimize an amount of time that the batteries 904 are at a cold temperature (e.g., minimize an amount of time that the batteries 904 are at a temperature less than the low temperature threshold).

The balancing manager 944 is configured to perform an energy balancing operation between different cells of the batteries 904, according to some embodiments. In some embodiments, the battery data provided by the battery sensor 926 includes a voltage of each of the cells of the batteries 904, and/or a SOC of sub-packs of the batteries 904. In some embodiments, the balancing manager 944 is configured to obtain the voltage of each of the cells of the batteries 904 and/or the SOC of the sub-packs of the batteries 904 and determine if any of the cells of the batteries 904 or the sub-packs exceeds a corresponding voltage value or SOC value, which may indicate that load balancing at the batteries 904 should be performed. If the voltage of any of the cells of the batteries 904 exceeds a threshold or is greater than the other cells of the batteries 904 by a predetermined amount or a percentage, the balancing manager 944 may generate control signals for the batteries 904 and provide the control signals to the batteries 904 to balance the energy of the cells of the batteries 904 (e.g., to transfer electrical energy out of a cell with high voltage to a cell with lower voltage, or to charge a cell with an unacceptably low voltage). Similarly, if the SOC of one of the sub-packs of the batteries 904 is excessively high or low (e.g., exceeds a threshold or is less than a threshold), the balancing manager 944 may operate the sub-packs of the batteries 904 to discharge power from the sub-pack with the excessively high SOC to a sub-pack with a lower SOC. Similarly, the balancing manager 944 may operate the sub-packs of the batteries 904 to charge a sub-pack with an unacceptably low SOC using power from another sub-pack. In some embodiments, the balancing manager 944 is configured to operate the cells or sub-packs of the batteries 904 so that the voltage or SOC of the cells or sub-packs of the batteries 904 are substantially all equal to each other, or all within a specific range of each other.

The network manager 946 is configured to control operation of the vehicle telematics system 910 to facilitate communications between the controller 902 and the remote system 914, according to some embodiments. In some embodiments, the network manager 946 is configured to retrieve various wireless communications or telematics data from the remote system 914. The remote system 914 can be configured to provide the scheduled deployment the or start time for the vehicle 10 as provided by a scheduling system or by a fleet manager. The network manager 946 is configured to provide the scheduled deployment time or the start time for the vehicle 10 to any of the hydraulic manager 934, the HVAC manager 932, the systems manager 936, the charging manager 938, the learning manager 940, the battery TMS manager 942, the balancing manager 944, or the historical charging DB 948. In some embodiments, the network manager 946 is also configured to provide data regarding the charging of the batteries 904 to the vehicle telematics system 910 for transmission to the remote system 914. The remote system 914 can also provide historical data regarding previous charges (e.g., time-series data, an amount of time that was required to charge the batteries 904 previously given corresponding conditions such as battery SOH, battery SOC, temperature at the batteries, environmental temperature, etc.). In some embodiments, the remote system 914 can store historical data and provide the historical data to the controller 902 via the vehicle telematics system 910. The historical data may be any historical data related to previous charges of the batteries 904, previous HVAC operations, or any other previous pre-conditioning operations (including any operating parameters, sensor data, etc., collected across the pre-conditioning time periods). In some embodiments, the historical data is stored in the historical charging DB 948, and retrieved by any of the components 932-946 for use.

Discharge Diagram

Referring to FIG. 16, the control system 900 is shown in an alternative mode of operation, when the batteries 904 discharge power to various electrical components of the vehicle 10. In some embodiments, the control system 900 as shown in FIG. 16 is structurally the same as the control system 900 as shown in FIG. 9A.

When the control system 900 operates to discharge power from the batteries 904 (e.g., after the vehicle 10 has been deployed along its route, or left a charging location), the battery charging system 906 may be disconnected (e.g., electrically decoupled) so that the batteries 904 are a primary source of electrical energy for the electrical components or sub-systems of the vehicle 10. In some embodiments, the batteries 904 are configured to provide discharge power (e.g., through a power distribution system 952 that may include any number of contactor relays, inverters, transformers, resistors, etc.) for consumption or use by the various vehicle system(s) 918, the HVAC system 912, the hydraulic heater circuit 920, the hydraulics 922 (e.g., if the hydraulics 922 include electric motors or pumps for pressurizing hydraulic fluid), the battery TMS 908, the HVAC system 912, etc. In some embodiments, the vehicle systems 918 include any of the lift assembly 108, the lift arm actuators 142, the articulation actuators 144, the tailgate actuators 134, the drum drive system 234, outriggers 330, the monitor 344, the pump system 432, the turntable 504, the lower lift cylinder 544, the upper lift cylinder 546, the lift actuators 646, etc. It should be understood that while the control system 900 is shown and described implemented on vehicle 10, the control system 900, and any of the techniques for pre-conditioning described herein with reference to FIGS. 9A-17, may be implemented on the refuse vehicle 100, the mixer truck 200, the fire fighting vehicle 300, the ARFF truck 400, the boom lift 500, or the scissor lift 600.

Figure 15:
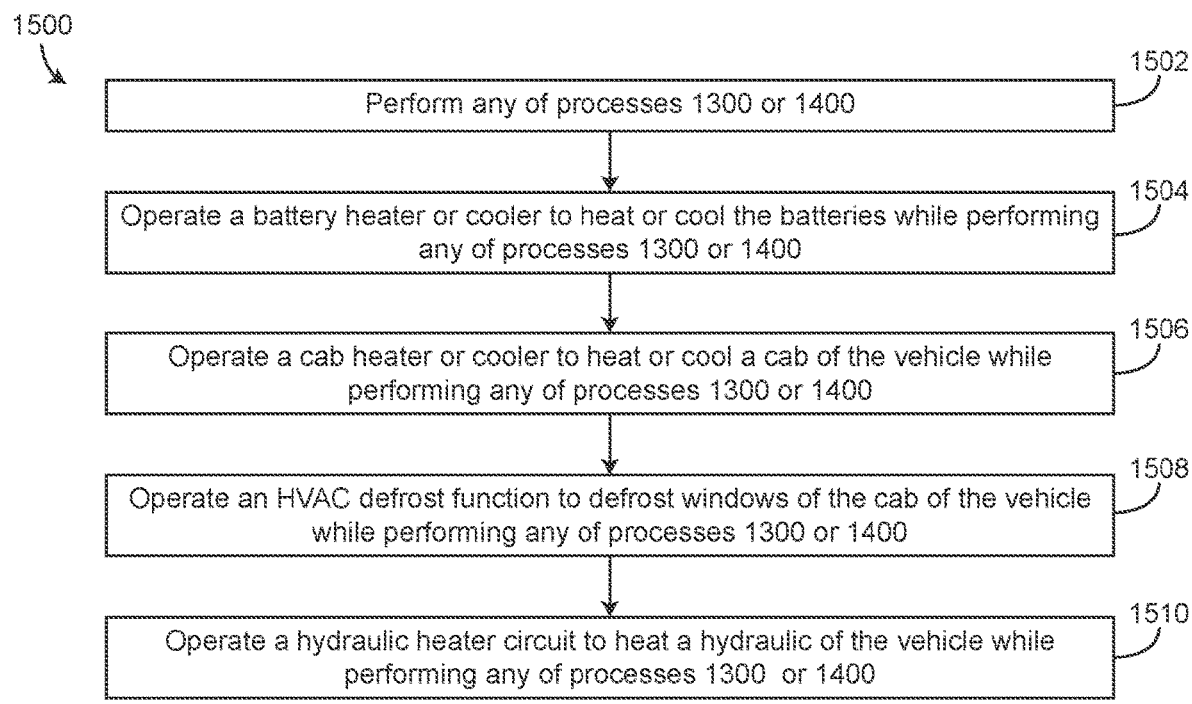
FIG. 15 is a flow diagram of a process for pre-conditioning a vehicle by performing one or more pre-conditioning operations while pre-charging batteries of the vehicle prior to a scheduled deployment time, according to an exemplary embodiment.

As shown in FIGS. 15 and 16, the control system 900 includes solar panels 950 that are configured to generate solar power and provide the solar power to the batteries 904 for charging the batteries 904. In some embodiments, the solar panels 950 are positioned on a roof of the vehicle 10. The solar panels 950 can be configured to generate 15% of 1 kW per cubic meter of the solar panels 950 during sunny conditions, according to some embodiments. The solar panels 950 can provide the generate solar power to the batteries 904 to offset some of the energy consumption (e.g., in kWh) of the batteries 904 over the course of the day as the vehicle 10 operates using the power provided by the batteries 904.

In some embodiments, the controller 902 is also configured to provide controls to the power distribution system 952. In some embodiments, the controller 902 is configured to minimize an on/off cycle of one or more of the contactors of the power distribution system 952. In some embodiments, the contactors function as relays that discretely transition between on-state and an off-state to provide or limit the provision of electrical energy or power from the batteries 904 to an electrical component (e.g., a linear electric actuator, an electric system, etc.). In some embodiments, the controller 902 is configured to minimize on/off cycles of the contactors of the power distribution system 952 in order to slow a consumption rate of the contactors, which may advantageously improve an actuation cycle life of the contactors.

In some embodiments, the controller 902 is also configured to provide controls to the vehicle systems 918 that consume power from the batteries 904. The controller 902 can monitor any of the battery data provided by the battery sensor(s) 926, and use the battery data to determine if the operation of the vehicle systems 918 should be adjusted (e.g., in real-time based on current conditions at the batteries 904). For example, if the vehicle 10, or more particularly the vehicle systems 918, include a front end loader (FEL) or an automatic side loader (ASL) arm, the controller 902 may allow gravity to lower the FEL or the ASL to thereby reduce power consumption. In some embodiments, the FEL or the ASL include a valve which is used to dampen the rate at which the FEL or ASL descends (e.g., due to gravity) without requiring operation of an electric pump, to thereby reduce energy consumption of the batteries 904. In some embodiments, the FEL or the ASL use hydraulic power to ascend and descend. The hydraulic power may be pressurized by an electric pump. The electric pump may be operated by the controller 902 to drive the FEL or the ASL to ascend, and a valve may be used to dampen high pressure return hydraulic fluid as gravity causes the FEL or the ASL to descend, thereby reducing power consumption of the batteries 904 and utilizing available potential energy of the FEL or ASL due to gravity.

Processes

Figure 13:
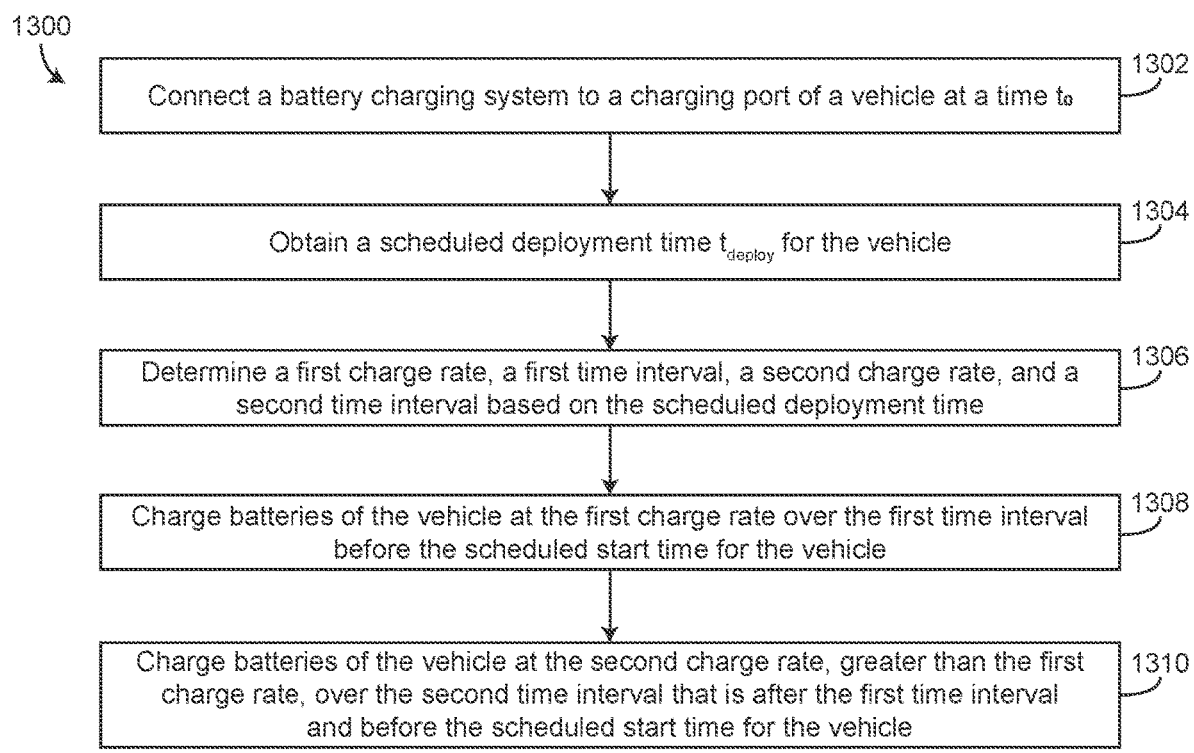
FIG. 13 is a flow diagram of a process for pre-conditioning a vehicle by pre-charging batteries of the vehicle prior to a scheduled deployment time, according to an exemplary embodiment.
Figure 14:
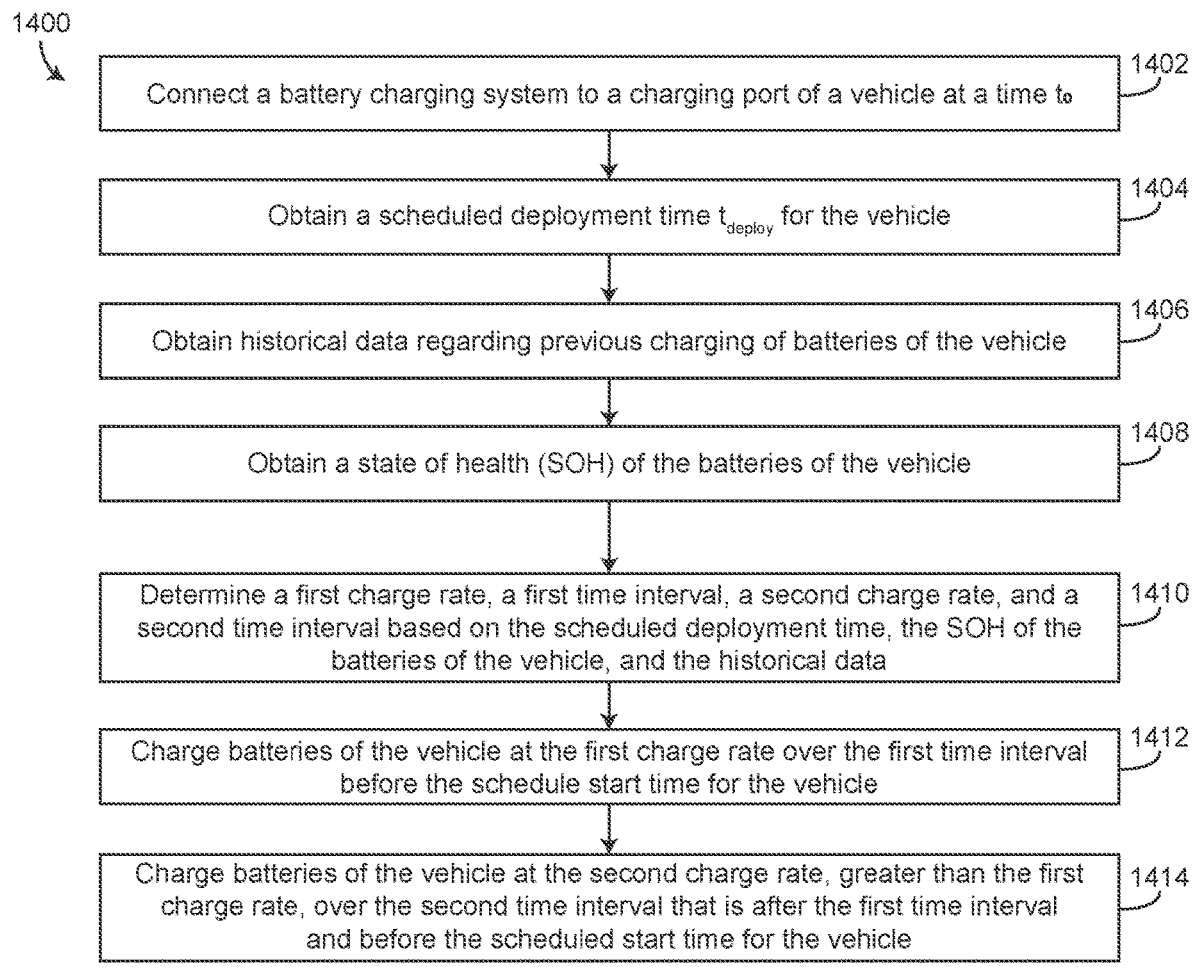
FIG. 14 is a flow diagram of a process for pre-conditioning a vehicle by pre-charging batteries of the vehicle prior to a scheduled deployment time, according to an exemplary embodiment.

Referring to FIGS. 13-15, various processes for pre-conditioning the vehicle 10 are shown. Process 1300 can be performed to perform a charging pre-conditioning of the batteries 904 of the vehicle 10. Process 1400 can be performed to perform a charging pre-conditioning of the batteries 904 of the vehicle 10 using SOH of the batteries and historical data of the batteries (e.g., historical charging data). Process 1500 can be performed to perform one or more other pre-conditioning operations of the vehicle 10 while also charging the batteries 904 of the vehicle 10.

Referring particularly to FIG. 13, a process 1300 for pre-conditioning the vehicle 10 by charging the batteries 904 prior to a deployment of the vehicle 10 is shown, according to some embodiments. The process 1300 includes steps 1302-1310 and can be performed by the controller 902 and an operator or technician of the vehicle 10. The process 1300 is performed so that the batteries 902 are fully charged before a scheduled deployment or start time of the vehicle 10 (e.g., when the vehicle 10 is scheduled to leave a home base).

Process 1300 includes connecting a battery charging system to a charging or electrical port of a vehicle at a time to (step 1302), according to some embodiments. In some embodiments, step 1302 is performed by electrically coupling a mainline power source with the vehicle 10, or by electrically coupling the battery charging system 906 with the vehicle 10 (e.g., at the batteries 904, at a charging port, etc.). The step 1302 may be performed by an operator or technician by physically coupling the charging system (e.g., the battery charging system 906) to the charging or electrical port of the vehicle 10. In some embodiments, electrically coupling the battery charging system with the vehicle 10 provides an electrical pathway between a mainline power source and the batteries 904 so that the batteries 904 can be charged from power provided by the mainline power source. The battery charging system may electrically couple with HV batteries of the vehicle 10. In some embodiments, the battery charging system is configured to provide DC-DC electrical power to the batteries 904. The battery charging system may be adjustable between different charging rates (e.g., by the controller 902). In some embodiments, electrically coupling the battery charging system with the charging port of the vehicle 10 also facilitates electrically coupling various other sub-systems of the vehicle 10 with the mainline power source through the battery charging system (e.g., without the power flowing to the sub-system through the batteries 904).

Process 1300 includes obtaining a scheduled deployment time $t_{deploy}$ for the vehicle (step 1304), according to some embodiments. In some embodiments, the scheduled deployment time $t_{deploy}$ is obtained from a telematics system (e.g., from a fleet manager, from a predefined list as provided by a fleet management system, etc.). In some embodiments, the scheduled deployment time $t_{deploy}$ is set by or at the battery charging system 906. The scheduled deployment time can also be provided via a user interface at the vehicle 10 (e.g., providing the scheduled deployment time to the controller 902 via a user interface or human machine interface (HMI)). In some embodiments, the scheduled deployment time is used (e.g., by the controller 902) to determine how to perform pre-conditioning operations so that the vehicle 10 is prepared (e.g., the batteries are fully charged) by the scheduled deployment time. In some embodiments, step 1304 is performed by the controller 902.

Process 1300 includes determining a first charge rate, a first time interval, a second charge rate, and a second time interval based on the scheduled deployment time (step 1306), according to some embodiments. In some embodiments, step 1306 is performed by the controller 902. In some embodiments, the first charge rate is associated with the first time interval, and the second charge rate is associated with the second time interval. In some embodiments, the first charge rate is a predetermined charge rate that is less than the second charge rate. For example, the first charge rate may be a trickle charge, while the second charge rate is significantly greater. In some embodiments, the first time interval is longer than the second time interval (e.g., twice as long, three times as long, more than three times as long, etc.). The first time interval and the second time interval may be determined based on an amount of time available to charge the batteries of the vehicle 10. For example, the first time interval and the second time interval may be determined as subsets or portions of a time duration between the time $t_0$ when the battery charging system is initially electrically coupled with the batteries and the scheduled deployment time $t_{deploy}$. In some embodiments, the first time interval and the second time interval are determined based on the scheduled deployment time $t_{deploy}$ relative to the initial time to, various battery data of the batteries, an initial SOC of the batteries, etc. In some embodiments, if there is a sufficient amount of time before the scheduled deployment time, the second charge rate is not even used, and the batteries are charged over a single time interval at a lowest possible charge rate to thereby minimize higher stresses to the batteries due to high charge rates.

Process 1300 includes charging batteries of the vehicle at the first charge rate over the first time interval before the scheduled start time for the vehicle (step 1308), and charging batteries of the vehicle at the second charge rate, greater than the first charge rate over the second time interval that is after the first time interval and before the scheduled start time for the vehicle (step 1310), according to some embodiments. In some embodiments, steps 1308-1310 are performed by the controller 902 and the battery charging system 906 to provide electrical power (e.g., charging power) to the batteries 904 at different rates over the first time interval and the second time interval, respectively (as shown in FIG. 10). It should be understood that while steps 1302-1310 of process 1300 show only two charging rates and two time intervals, the batteries may be charged according to any number of charging rates and corresponding time intervals (e.g., three as shown in FIG. 11).

Referring to FIG. 14, a process 1400 for pre-conditioning the vehicle 10 by charging the batteries (e.g., the batteries 904) is shown, according to some embodiments. Process 1400 includes steps 1402-1414, according to some embodiments, and may be performed at least partially by the controller 902, or more generally, the control system 900. In some embodiments, the process 1400 is similar to the process 1300 but includes additional considerations such as SOH of the batteries of the vehicle 10.

Process 1400 includes connecting a battery charging system to a charging port of a vehicle (e.g., the vehicle 10), at a time to (step 1402), and obtaining a scheduled deployment time $t_{deploy}$ for the vehicle (step 1404), according to some embodiments. In some embodiments, steps 1402-1404 are the same as or similar to steps 1302-1304 of process 1300 as described in greater detail above with reference to FIG. 13.

Process 1400 includes obtaining historical data regarding previous charging of the batteries of the vehicle (step 1406), according to some embodiments. In some embodiments, step 1406 includes retrieving historical data for the specific vehicle and batteries from a database. In some embodiments, step 1406 includes obtaining historical data regarding previous charges of the batteries from a telematics system (e.g., telematics system 910) of the vehicle (e.g., vehicle 10). In some embodiments, the historical data includes time-series data of voltage of the batteries 904, time-series data of SOH of the batteries 904, time-series data of SOC of the batteries 904, charging rates of the batteries 904, etc., over previous charges. The historical data may also include an amount of time that was previously required to charge the batteries 904 at a corresponding SOH of the batteries 904 and for an initial SOC of the batteries. Step 1406 may be performed by the charging manager 938 of the controller 902. In some embodiments, the historical data is retrieved from the historical charging DB 948. In some embodiments, the historical data is provided by the remote system 914 via the vehicle telematics system 910 to the controller 902.

Process 1400 includes obtaining a SOH of the batteries of the vehicle (step 1408), according to some embodiments. In some embodiments, the SOH of the batteries 904 is determined by the controller 902 based on real-time information obtained from the batteries or charging system. In some embodiments, the SOH of the batteries is estimated based on the historical data (e.g., based on the previously determined SOH of the batteries). Step 1408 can be performed by the charging manager 938 of the controller 902.

Process 1400 includes determining a first charge rate, a first time interval, a second charge rate, and a second time interval based on the scheduled deployment time, the SOH of the batteries of the vehicle, and the historical data (step 1410), according to some embodiments. In some embodiments, the first charge rate has a value that is lower than the second charge rate. In some embodiments, the first charge rate is a trickle charge, and the second charge rate is a high charge rate. The first time interval is longer than the second time interval. The controller 902 can use the historical data to determine an amount of time required to charge the batteries 904 at the current SOH of the batteries 904, to estimate, based on previous charges of the batteries 904, an amount of time required to charge the batteries 904, to estimate, based on the SOH of the batteries 904 and the historical data, an amount of losses expected to occur while charging the batteries 904 due to SOH of the battery and therefore an additional amount of time or charging power required to sufficiently charge the batteries 904, etc. In some embodiments, step 1410 includes generating a model based on the historical data using a regression technique. The model may predict a number of time intervals, a length of each of the time intervals, charging rates, etc. In some embodiments, step 1410 includes using current conditions at the batteries 904 (e.g., the current SOC, the current SOH, etc.) as inputs to the model to determine the first charge rate, the first time interval, the second charge rate, and the second charge interval.

Process 1400 includes charging the batteries of the vehicle at the first charge rate over the first time interval before the scheduled start time for the vehicle (step 1412) and charging batteries of the vehicle at the second charge rate, greater than the first charge rate, over the second time interval that is after the first time interval and before the schedule start time for the vehicle (step 1414), according to some embodiments. In some embodiments, step 1412 and 1414 are the same as or similar to the steps 1308 and 1310 of the process 1300 as described in greater detail above with reference to FIG. 13.

Referring to FIG. 15, a process 1500 for pre-conditioning the vehicle 10 in various other ways than charging the batteries, while at least partially simultaneously charging the batteries is shown, according to some embodiments. Process 1500 includes steps 1502-1510 which may be performed at least partially simultaneously or concurrently with any of the steps of processes 1300 or 1400, according to some embodiments.

Process 1500 includes performing any of processes 1300 or 1400 (step 1502), according to some embodiments. In some embodiments, step 1502 is performed simultaneously with any of steps 1504-1512. Process 1500 also includes operating a battery heater or cooler to heat or cool the batteries while performing any of processes 1300 or 1400 (step 1504), according to some embodiments. In some embodiments, step 1504 is performed by the control system 900, or more particularly, by the controller 902 of control system 900. Step 1504 can include determining control signals for a battery HVAC system (e.g., battery TMS 908), based on a high temperature threshold and a low temperature threshold, a current environmental temperature, and a current temperature at the batteries (e.g., batteries 904). In some embodiments, step 1504 is initiated in response to the environmental temperature or temperature at the batteries indicating that the batteries are not at a suitable temperature for charging (e.g., the temperature at the batteries is above the high temperature threshold or below the low temperature threshold). In some embodiments, step 1504 is initiated after the vehicle 10 is electrically coupled with a mainline power source (e.g., via the battery charging system 906). In some embodiments, the battery HVAC system that provides heating or cooling to the batteries draws power from the mainline power source, without drawing power through the batteries. In some embodiments, step 1504 includes comparing the current temperature at the batteries to a desired operation temperature, and providing heating or cooling to the batteries to drive the current temperature at the batteries toward the desired operation temperature. Step 1504 can include switching from heating to cooling and vice versa in response to the current temperature at the batteries exceeding the high temperature threshold or dropping below the low temperature threshold. In some embodiments, step 1504 includes providing ventilation to induce an airflow across the batteries of the vehicle.

Process 1500 includes operating a cab heater or cooler to heat or cool a cab of the vehicle while performing any of processes 1300 or 1400 (step 1506), according to some embodiments. In some embodiments, step 1506 is performed by the control system 900, or more particularly, by the controller 902 of the control system 900. Step 1506 can include determining control signals for an HVAC system that serves the cab (e.g., HVAC system 912 that provides heating, cooling, or ventilation for cab 40). In some embodiments, step 1506 includes operating the HVAC system for the cab (e.g., the cab heater or cooler) to provide heating or cooling to the cab based on a current temperature of the cab, a high temperature threshold, and a low temperature threshold. In some embodiments, step 1506 includes performing a closed loop control scheme (e.g., PID control, deadband control, etc.) to drive the current temperature of the cab between the high temperature threshold and the low temperature threshold, and to maintain the current temperature of the cab between the high temperature threshold and the low temperature threshold. In some embodiments, step 1506 includes using a thermal model and the scheduled deployment time of the vehicle to determine when to initiate heating or cooling to achieve the current temperature within the cab by the scheduled deployment time.

Process 1500 includes operating an HVAC defrost function to defrost windows of the cab of the vehicle while performing any of processes 1300 or 1400 (step 1508), according to some embodiments. In some embodiments, step 1508 includes activating or deactivating a defrost function of the HVAC system (e.g., the cab heater or cooler) of step 1506. In some embodiments, step 1508 includes determining a time at which to initiate the defrost function based on a detected amount of frost on windows of the cab (e.g., the windshield) or based on a current environmental temperature surrounding the cab. The time at which to initiate the defrost function may also be determined based on the scheduled deployment time so that the windows of the cab are defrosted by the scheduled deployment time.

Process 1500 includes operating a hydraulic heater circuit to heat a hydraulic or hydraulic fluid of the vehicle while performing any of processes 1300 or 1400 (step 1510), according to some embodiments. In some embodiments, step 1510 includes using an environmental temperature or current temperature at the hydraulics in order to determine if the hydraulic fluid requires heating. For example, if the environmental temperature is below freezing, the hydraulic heater circuit may be activated to drive the hydraulic fluid to an operating temperature. In some embodiments, the hydraulic heater circuit is transitionable between an activated state or mode and a deactivated state or mode.

Advantageously, performing process 1500 facilitates pre-conditioning the vehicle (e.g., the vehicle 10) by both charging the batteries and at least one of maintaining the batteries within desired values, maintaining a temperature within the cab within desired values, defrosting windows of the cab of the vehicle, or heating the hydraulic fluid.

Alternative Techniques

Referring to FIGS. 9A-9B and 16, the control system 900 can be configured to operate auxiliary loads (e.g., the vehicle systems 918, the hydraulic heater circuit 920, the battery TMS 908, the HVAC system 912, etc.) in order to achieve a desired SOC at the batteries 904. For example, if the batteries 904 are at 100% SOC, and it is desired that the batteries 904 should be at 50% SOC (e.g., for shipping or service, if the vehicle 10 is immobilized and the batteries 904 should be removed, etc.), the controller 902 may operate the auxiliary loads and monitor SOC feedback from the batteries 904 to achieve the desired SOC.

In some embodiments, the controller 902 is configured to operate the auxiliary systems (e.g., the vehicle systems 918) or any electrical components that draw power from the batteries 904 (e.g., from HV batteries) at a reduced capability (e.g., at 50% of their capabilities) so that testing can be performed while operating the auxiliary systems. In some embodiments, the controller 902 can transition into a low priority feature and operate any of the vehicle systems 918 at the reduced capacity, such as reducing single loads or any combination of loads including coolant pumps and fans.

In some embodiments, the controller 902 is configured to initiate a test mode for diagnostics or to perform an automatic test of components of the vehicle 10 prior to the scheduled deployment time. For example, the controller 902 may, as a pre-conditioning operation, check health state of all devices, systems, sub-systems, etc., of the vehicle 10 (e.g., the vehicle systems 918, the HVAC system 912, the vehicle telematics system 910, the battery TMS 908, the solar panels 950, the power distribution system 952, the hydraulics 922, the hydraulic heater circuit 920, etc.), prior to the deployment time to ensure that the vehicle 10 is operating properly. If one or more components, devices, or systems, are not operating properly, the controller 902 can operate a display (e.g., an HMI) to notify a user regarding which components are not operating properly, and/or may sent a message to a fleet manager (e.g., send a message to the remote system 914 via the vehicle telematics system 910) regarding the components that are not operating properly.

In some embodiments, the controller 902 is also configured to provide a test dashboard to a control desk (e.g., to the remote system 914) illustrating the functionality of different components, systems, etc., of the vehicle 10. For example, the test dashboard can include a list of each of the components of the vehicle 10 (e.g., each of the vehicle systems 918, the sensors 924, the HVAC system 912, the battery TMS 908, the batteries 904, the power distribution system 952, the solar panels 950, the hydraulics 922, the hydraulic heater circuit 920, etc.), and provide information to a user so that the user can check if each of the components of the vehicle 10 are operating properly, to prompt the user to initiate manual tests of the components of the vehicle 10, or to prompt the user to initiate automatic tests of the components of the vehicle 10. The list may be color-coded with green or red or yellow, with green indicating that a corresponding component, system, or sub-system of the vehicle 10 is operating properly, yellow indicating that a test or check should be performed, and red indicating that the component, system, or sub-system is not operating properly and needs to be inspected.

Figure 17:
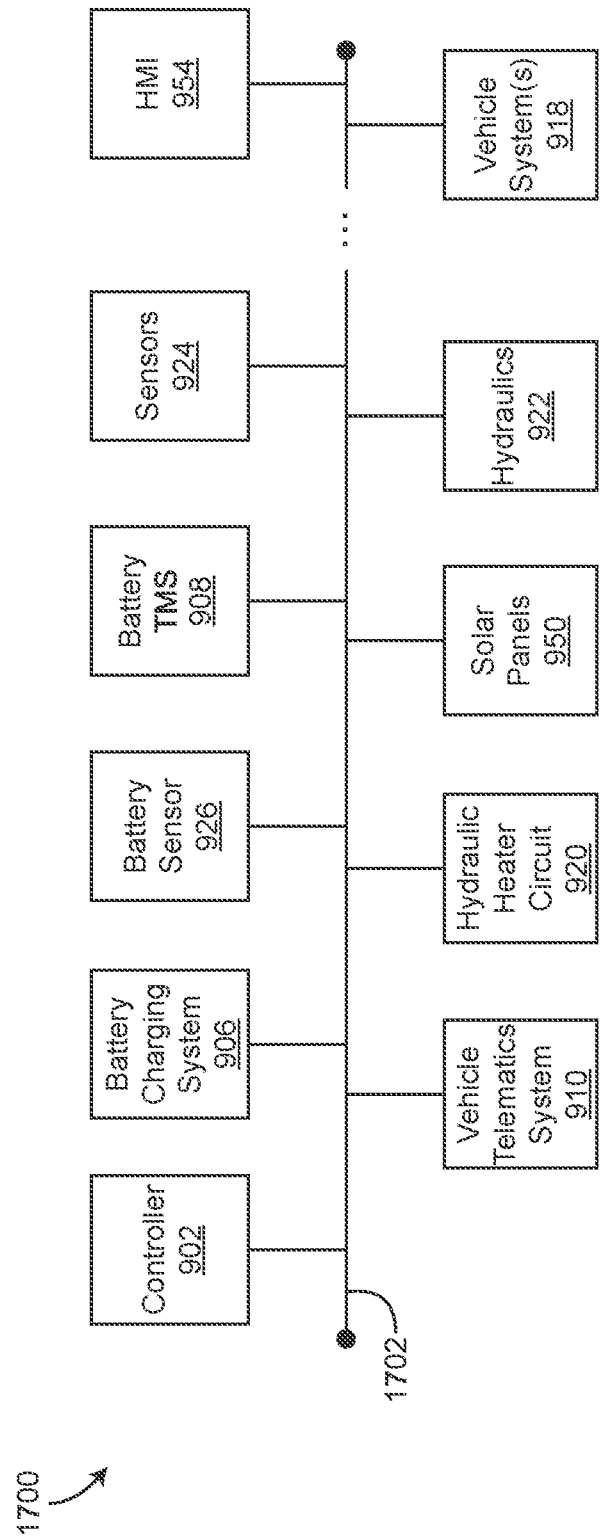
FIG. 17 is a diagram of a controller area network (CAN) bus of the control system of FIGS. 9A-9B and 16, according to an exemplary embodiment.

Referring to FIGS. 9A, 9B, 16, and 17, in some embodiments, the controller 902 is configured to identify, as a pre-conditioning operation, if each device connected on a CAN bus 1702 of the vehicle 10 is terminated properly, as shown in CAN system 1700 of FIG. 17. For example, the controller 902 may measure resistance at each of the components connected with the CAN bus 1702 of the vehicle 10, and compare the resistance to an expected value (e.g., approximately 60 Ohms). The controller 902 can, in this way, identify if the components of the vehicle 10 (including sensors, systems, sub-systems, or any other electrical component, controller, etc., that provides data to the CAN bus 1702) are properly communicating on the CAN bus 1702 and can therefore identify which components can communicate properly with the controller 902. The controller 902 can therefore identify disconnected or faulty devices and notify the remote system 914 (e.g., via the vehicle telematics system 910) regarding disconnected or faulty devices, or can notify a user (e.g., by operating an HMI) that one or more devices are disconnected or potentially faulty.

In some embodiments, the controller 902 is configured to identify if any of the devices on the CAN bus 1702 have properly connected to 24 volt power. For example, the controller 902 can communicate with any of the devices on the CAN bus 1702 to identify if the devices are appropriately connected with 24 volt power and 24 volt ground before applying 24 volt power to the devices. In some embodiments, the controller 902 is configured to query or ping each of the devices on the CAN bus 1702 in order to obtain network addresses of each of the devices. For example, the controller 902 may send a query, request, or ping request via the CAN bus 1702, and the devices on the CAN bus 1702 may respond or send a reply to the controller 902 with their addresses so that the controller 902 can confirm that each device on the CAN bus 1702 is communicating properly and/or reporting from expected addresses.

In some embodiments, the controller 902 is configured to identify once all the devices on the CAN bus 1702 are up and running and communicating properly. Once the devices on the CAN bus 1702 are determined to be operating and communicating properly, the controller 902 can initiate manual disconnection of one or more of the devices on the CAN bus 1702 (e.g., by providing a notification to a user via HMI 954). In some embodiments, the user may unplug the devices identified by the controller 902 from the CAN bus 1702 and can monitor what happens on the vehicle 10 when the devices are disconnected from the CAN bus 1702.

In some embodiments, the controller 902 is configured to provide a control command to one or more devices on the CAN bus 1702, and monitor reaction of the vehicle 10 to the control command. In some embodiments, the DC output voltage of the batteries 904 is compared to a test profile of voltage setpoint versus time for the control command or action thereof to determine if the actual DC output voltage of the batteries matches the test profile (e.g., determine if the corresponding high voltage load and low voltage level feedback from the other devices on the CAN bus 1702 agree with a test profile).

In some embodiments, the controller 902 is configured to operate the HMI 954 to display a checklist to a technician or user of the vehicle 10, including a screen of each different device on the CAN bus 1702 which should be connected or disconnected in a HV loop to verify that the CAN system 1700 registers such an action properly. In some embodiments, the controller 902 is configured to initiate HV isolation and voltage feedback tests on the charging system 906, the batteries 904, etc., to determine if the battery charging system 906 and/or the batteries 904 are currently in a known acceptable state, and then applying known resistors to induce a 500 Ohm/volt or 100 Ohm/volt fault.

Advantageously, the commissioning or testing pre-conditioning operations described herein with reference to FIGS. 9A, 9B, and 16 can be performed prior to deployment of the vehicle 10 and facilitates reduction in many common issues such as low voltage pin out, CAN interface errors, software errors, etc.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A control system for pre-conditioning a refuse vehicle, the control system comprising processing circuitry configured to:
    obtain a scheduled deployment time of the refuse vehicle from a fleet management system, the scheduled deployment time being a time at which the refuse vehicle is dispatched to a route;
    perform a first pre-conditioning operation over a first time interval and a second time interval to prepare the refuse vehicle by the scheduled deployment time; and
    perform a plurality of other pre-conditioning operations at least partially simultaneously with performing the first pre-conditioning operation over at least the second time interval to prepare the refuse vehicle by the scheduled deployment time, the plurality of other pre-conditioning operations comprising a second pre-conditioning operation, the processing circuitry configured to:
        determine a time during the first time interval or the second time interval at which to initiate a hydraulic heating action for a lift apparatus or compaction system of the refuse vehicle based on an environmental temperature and the scheduled deployment time such that a temperature at a hydraulic of the lift apparatus or the compaction system of the refuse vehicle will be substantially equal to a target temperature at the scheduled deployment time;
        verify, based on communications from a controller of the lift apparatus or compaction system, that the lift apparatus or compaction system is operable; and
        initiate the hydraulic heating action at the time.

2. The control system of claim 1, wherein performing the first pre-conditioning operation comprises operating a charging system to charge batteries of the refuse vehicle at a first charge rate over the first time interval and a second charge rate over the second time interval to fully charge the batteries by the scheduled deployment time, the first charge rate is less than the second charge rate and the first time interval is greater than the second time interval, the charging system being configured to provide electrical energy to the batteries for charging, the batteries being configured to provide electrical energy for driving tractive elements of the refuse vehicle.

3. The control system of claim 2, wherein the plurality of other pre-conditioning operations comprises a third pre-conditioning operation, the processing circuitry configured to:
    operate an HVAC system for a cab of the refuse vehicle to drive a temperature of the cab to be within a high temperature threshold and a low temperature threshold by the scheduled deployment time.

4. The control system of claim 3, wherein the plurality of other pre-conditioning operations comprises a fourth pre-conditioning operation, the processing circuitry configured to:
    activate a defrost operation of the HVAC system for the cab of the refuse vehicle to defrost a window of the refuse vehicle by the scheduled deployment time.

5. The control system of claim 4, wherein the plurality of other pre-conditioning operations comprises a fifth pre-conditioning operation, the processing circuitry configured to:
    operating a thermal management system of the refuse vehicle to maintain a temperature at the batteries within a high temperature threshold and a low temperature threshold across the first time interval and the second time interval.

6. The control system of claim 5, wherein the plurality of other pre-conditioning operations comprises a sixth pre-conditioning operation, the processing circuitry configured to:
    send a request to each of a plurality of devices on a controller area network (CAN) bus;
    monitor a reply from each of the plurality of devices on the CAN bus;
    determine, based on the reply or a presence of the reply from each of the plurality of devices on the CAN bus, which of the plurality of devices are communicating properly, and which are not communicating properly; and
    activate one or more of the plurality of devices on the CAN bus.

7. The control system of claim 1, wherein the processing circuitry is configured to determine the time during the first time interval or the second time interval at which to initiate the hydraulic heating action based on historical data of both environmental temperature and an amount of time required to heat the hydraulic to the target temperature.

8. A method for pre-conditioning a refuse vehicle, the method comprising:
obtaining a scheduled deployment time of the refuse vehicle from a fleet management system, the scheduled deployment time being a time at which the refuse vehicle is dispatched to a route;
performing a first pre-conditioning operation over a first time interval and a second time interval to prepare the refuse vehicle by the scheduled deployment time; and
performing a plurality of other pre-conditioning operations at least partially simultaneously with performing the first pre-conditioning operation over at least the second time interval to prepare the refuse vehicle by the scheduled deployment time, the plurality of other pre-conditioning operations comprising a second pre-conditioning operation, comprising:
determining a time during the first time interval or the second time interval at which to initiate a hydraulic heating action for a lift apparatus or compaction system of the refuse vehicle based on an environmental temperature and the scheduled deployment time such that a temperature of a hydraulic of the lift apparatus or the compaction system of the refuse vehicle will be substantially equal to a target temperature at the scheduled deployment time;
verify, based on communications from a controller of the lift apparatus or compaction system, that the lift apparatus or compaction system is operable; and
initiating the hydraulic heating action at the time.

9. The method of claim 8, wherein performing the first pre-conditioning operation comprises operating a charging system to charge batteries of the refuse vehicle at a first charge rate over the first time interval and a second charge rate over the second time interval to fully charge the batteries by the scheduled deployment time, the first charge rate is less than the second charge rate and the first time interval is greater than the second time interval, the charging system being configured to provide electrical energy to the batteries for charging, the batteries being configured to provide electrical energy for driving tractive elements of the refuse vehicle.

10. The method of claim 9, wherein the plurality of other pre-conditioning operations comprises a third pre-conditioning operation comprising:
operating an HVAC system for a cab of the refuse vehicle to drive a temperature of the cab to be within a high temperature threshold and a low temperature threshold by the scheduled deployment time.

11. The method of claim 10, wherein the plurality of other pre-conditioning operations comprises a fourth pre-conditioning operation comprising:
activating a defrost operation of the HVAC system for the cab of the refuse vehicle to defrost a window of the refuse vehicle by the scheduled deployment time.

12. The method of claim 11, wherein the plurality of other pre-conditioning operations comprises a fifth pre-conditioning operation comprising:
operating a thermal management system of the refuse vehicle to maintain a temperature at the batteries within a high temperature threshold and a low temperature threshold across the first time interval and the second time interval.

13. The method of claim 12, wherein the plurality of other pre-conditioning operations comprises a sixth pre-conditioning operation comprising:

sending a request to each of a plurality of devices on a controller area network (CAN) bus;
monitoring a reply from each of the plurality of devices on the CAN bus;
determining, based on the reply or a presence of the reply from each of the plurality of devices on the CAN bus, which of the plurality of devices are communicating properly, and which are not communicating properly; and
activating one or more of the plurality of devices on the CAN bus.

14. The method of claim 8, wherein the determining the time during the first time interval or the second time interval at which to initiate the hydraulic heating action comprises determining the time based on historical data of both environmental temperature and an amount of time required to heat the hydraulic to the target temperature.

15. A refuse vehicle comprising processing circuitry configured to:
obtain a scheduled deployment time of the refuse vehicle from a fleet management system, the scheduled deployment time being a time at which the refuse vehicle is dispatched to a route;
perform a first pre-conditioning operation by operating a charging system to charge batteries of the refuse vehicle at a first charge rate over a first time interval, and a second charge rate over a second time interval to fully charge the batteries by the scheduled deployment time, the charging system being configured to provide electrical energy to the batteries for charging, wherein the first charge rate is less than the second charge rate and the first time interval is greater than the second time interval, the batteries being configured to provide electrical energy for driving tractive elements of the refuse vehicle; and
perform a plurality of other pre-conditioning operations at least partially simultaneously with performing the first pre-conditioning operation, the plurality of other pre-conditioning operations comprising a second pre-conditioning operation, the processing circuitry configured to:
determine a time during the first time interval or the second time interval at which to initiate a hydraulic heating action for a lift apparatus or compaction system of the refuse vehicle based on an environmental temperature and the scheduled deployment time such that a temperature of a hydraulic of the lift apparatus or the compaction system of the refuse vehicle will be substantially equal to a target temperature at the scheduled deployment time;
verify, based on communications from a controller of the lift apparatus or compaction system, that the lift apparatus or compaction system is operable; and
initiate the hydraulic heating action at the time.

16. The refuse vehicle of claim 15, wherein the plurality of other pre-conditioning operations comprises a third pre-conditioning operation comprising:
operating an HVAC system for a cab of the refuse vehicle to drive a temperature of the cab to be within a high temperature threshold and a low temperature threshold by the scheduled deployment time.

17. The refuse vehicle of claim 16, wherein the plurality of other pre-conditioning operations comprises a fourth pre-conditioning operation comprising:
activating a defrost operation of the HVAC system for the cab of the refuse vehicle to defrost a window of the refuse vehicle by the scheduled deployment time.

18. The refuse vehicle of claim 17, wherein the plurality of other pre-conditioning operations comprises a fifth pre-conditioning operation comprising:
  operating a thermal management system of the refuse vehicle to maintain a temperature at the batteries within a high temperature threshold and a low temperature threshold across the first time interval and the second time interval.

19. The refuse vehicle of claim 18, wherein the plurality of other pre-conditioning operations comprises a sixth pre-conditioning operation comprising:
  sending a request to each of a plurality of devices on a controller area network (CAN) bus;
  monitoring a reply from each of the plurality of devices on the CAN bus;
  determining, based on the reply or a presence of the reply from each of the plurality of devices on the CAN bus, which of the plurality of devices are communicating properly, and which are not communicating properly; and
  activating one or more of the plurality of devices on the CAN bus.

20. The refuse vehicle of claim 15, wherein the processing circuitry is configured to determine the time during the first time interval or the second time interval at which to initiate the hydraulic heating action based on historical data of both environmental temperature and an amount of time required to heat the hydraulic to the target temperature.

* * * * *